United States Patent
Mashiki

(10) Patent No.: US 6,325,052 B1
(45) Date of Patent: Dec. 4, 2001

(54) APPARATUS FOR DETECTING CONCENTRATION OF VAPOR FUEL IN LEAN-BURN INTERNAL COMBUSTION ENGINE, AND APPLIED APPARATUS THEREOF

(75) Inventor: Zenichiro Mashiki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/276,529

(22) Filed: Mar. 25, 1999

(30) Foreign Application Priority Data

Mar. 30, 1998 (JP) .................................................. 10-084777

(51) Int. Cl.$^7$ .................................................. F02M 33/02
(52) U.S. Cl. ........................................... 123/520; 123/674
(58) Field of Search .................... 123/295, 305, 123/518, 519, 520, 674, 698

(56) References Cited

U.S. PATENT DOCUMENTS

| | | | |
|---|---|---|---|
| 4,955,339 | * 9/1990 | Sasaki et al. | 123/295 |
| 5,245,975 | 9/1993 | Ito | 123/520 |
| 5,438,967 | 8/1995 | Ito | 123/339.12 |
| 5,515,834 | 5/1996 | Hoshino et al. | |
| 5,613,481 | 3/1997 | Kitagawa et al. | 123/698 |
| 5,632,261 | 5/1997 | Maki et al. | |
| 5,655,507 | * 8/1997 | Kawasaki | 123/674 |
| 5,699,778 | 12/1997 | Muraguchi et al. | |
| 5,755,198 | * 5/1998 | Grob et al. | 123/295 |
| 5,765,372 | 6/1998 | Mitobe et al. | 60/301 |
| 5,806,507 | * 9/1998 | Osanai | 123/698 |
| 6,079,397 | 6/2000 | Matsumoto et al. | |

FOREIGN PATENT DOCUMENTS

| | | |
|---|---|---|
| 4402588 | 1/1994 | (DE). |
| 195 38 786 | 10/1995 | (DE). |
| 0 488 254 A | 3/1992 | (EP). |
| 0 869 268 A | 10/1998 | (EP). |
| 0 889 221 A | 1/1999 | (EP). |
| 0 893 593 A | 1/1999 | (EP). |
| 2 759 420 A | 8/1998 | (FR). |
| A-4-194354 | 7/1992 | (JP). |
| A-4-295150 | 10/1992 | (JP). |
| A-5-71430 | 3/1993 | (JP). |
| A-5-223017 | 8/1993 | (JP). |
| A-6-137190 | 5/1994 | (JP). |
| A-6-147033 | 5/1994 | (JP). |
| A-6-200794 | 7/1994 | (JP). |
| A-8-177572 | 7/1996 | (JP). |

\* cited by examiner

Primary Examiner—Henry C. Yuen
Assistant Examiner—Mahmoud M Gimie
(74) Attorney, Agent, or Firm—Oliff & Berridge, PLC

(57) ABSTRACT

An apparatus for detecting a concentration of a vapor fuel in a lean-burn internal combustion engine includes a module for performing purge concentration learning when in a lean-burn where an air/fuel ratio sensor does not sufficiently work. When detecting the concentration of the vapor fuel during a lean-burn operation of the internal combustion engine, the internal combustion engine is switched over to a homogeneous combustion operation from a lean-burn operation, and the concentration of the vapor fuel is detected under the homogeneous combustion operation. Alternatively, the combustion is switched over to the homogeneous combustion when in a rich spike and when ensuring a brake negative pressure, and hence the concentration of the vapor fuel is detected by utilizing this timing. The thus detected and learned concentration of the vapor fuel is utilized for the purge control when in the lean-burn.

7 Claims, 16 Drawing Sheets

(a)

(b)

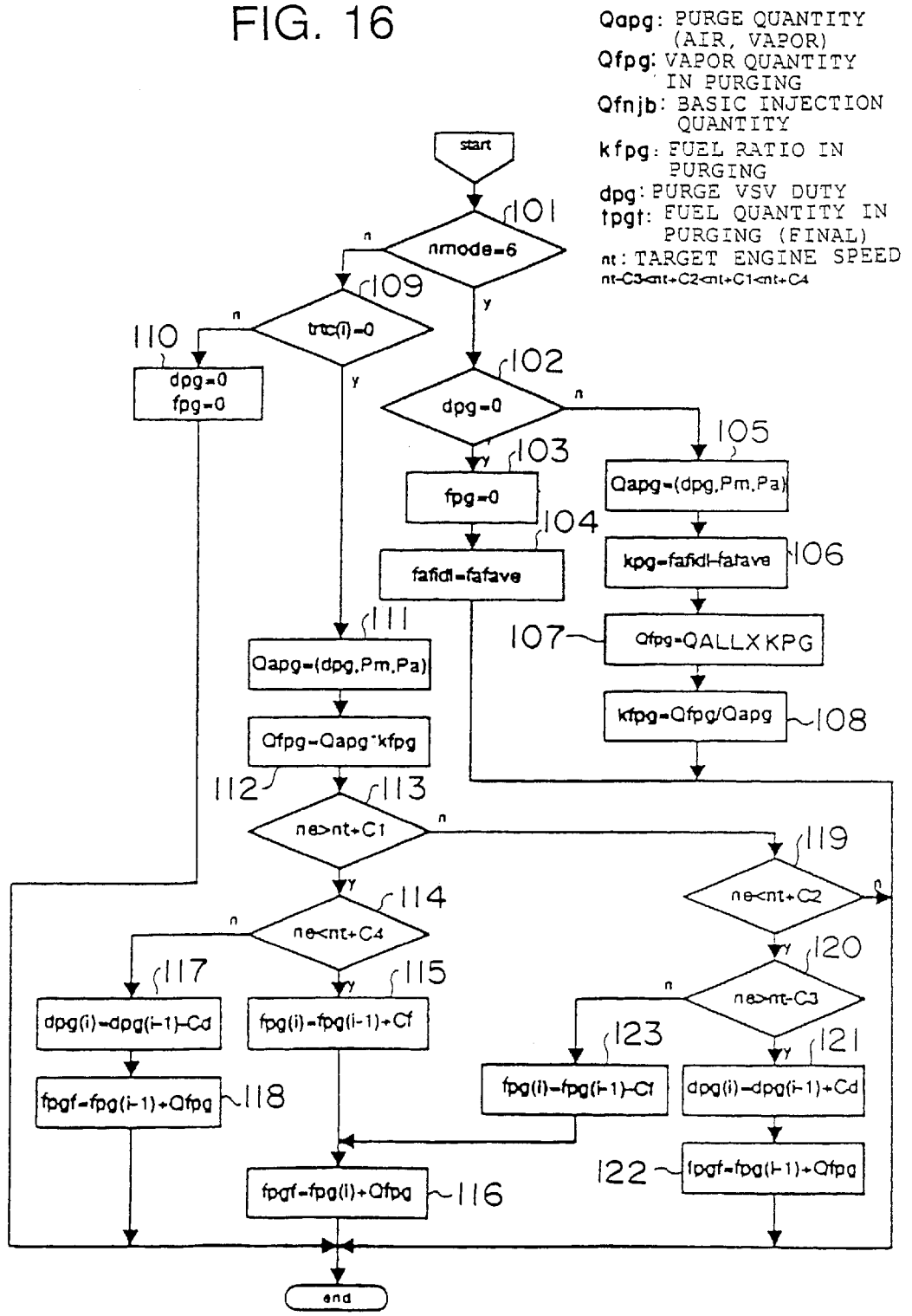

APPARATUS FOR DETECTING CONCENTRATION OF VAPOR FUEL IN LEAN-BURN INTERNAL COMBUSTION ENGINE, AND APPLIED APPARATUS THEREOF

BACKGROUND OF THE INVENTION

1. Field of the Invention

The present invention relates to a vapor fuel supply control apparatus in a lean-burn internal combustion engine, which supplies an intake system with a vapor fuel produced in, e.g., a fuel tank etc in accordance with an operating state of the lean-burn internal combustion engine.

2. Related Background Art

In an engine which has hitherto generally been used, the fuel is injected out of a fuel injection valve to an intake port, and a combustion chamber is previously supplied with a homogeneous air-fuel mixture of the fuel and the air. In the thus constructed engine, an intake passageway is opened and closed by a throttle valve interlocking with an operation of an accelerator.

A quantity of the intake air supplied to the combustion chamber of the engine (which is resultantly a quantity of a homogeneously mixed gas of the fuel and the air) is controlled by opening and closing the throttle valve, thereby controlling an output of the engine.

According to the technology based on the so-called homogeneous combustion described above, a large intake negative pressure is produced with a throttle operation of the throttle valve, and a pumping loss becomes large, resulting in a decline of efficiency. By contrast, a technology known as a so-called stratified charge combustion, wherein the throttle valve is throttled small, the fuel is supplied directly to the combustion chamber, a combustible air-fuel mixture is thereby made to exist in the vicinity of a spark plug, and an igniting property is enhanced by increasing an air/fuel ratio of the portion concerned. According to this technology, when in a low-load state of the engine, the fuel injected is supplied in dispersion around the spark plug, and the stratified charge combustion is executed with the throttle valve substantially fully opened. The pumping loss is thus reduced, and a fuel consumption is enhanced.

The internal combustion engine capable of performing the above-described stratified charge combustion sequentially assumes, for example, when changed from the low-load to a high-load, combustion states such as the stratified charge combustion, a semi-stratified charge combustion, a homogeneous lean-burn and a homogeneous combustion.

The stratified charge combustion is, as explained before, that the air/fuel mixture exhibiting a low air/fuel ratio is made to exist in the vicinity of the spark plug, and is stratified between this mixture and a gas at another portion.

The semi-stratified charge combustion has a smaller degree of its being stratified than the stratified charge combustion.

The homogeneous lean-burn has a homogeneousity of the fuel and the air but is small in terms of a ratio of the fuel.

The homogeneous combustion has a homogeneous mixture of the fuel and the air and a high ratio of the fuel.

Further, there might be a case where a swirl is formed in the air/fuel mixture of the injected fuel when the above-described stratified charge combustion is conducted, and when the lean-burn is effected. That is, an intake port is provided with a swirl control valve (SCV), and an aperture of this valve SCV is controlled, thereby controlling an intensity of the swirl. As a result, the combustibility is enhanced with a small amount of the fuel supplied.

Incidentally, there is known an apparatus for controlling a supply of a vapor fuel in a lean-burn internal combustion engine (Japanese Patent Application Laid-Open Publication No.4-194354) constructed such that the vapor fuel (vapor) from the fuel tank etc is temporarily accumulated in a canister, and the vapor fuel accumulated is supplied to an intake system in accordance with an operating state of the internal combustion engine.

According to this technology, a purge control valve is provided within a vapor fuel oriented purge passageway through which the canister for adsorbing the vapor fuel is connected to an intake passageway. Then, the purge control valve is controlled so as to obtain a proper fuel purge quantity (a quantity of the vapor fuel introduced into the intake passageway, which is hereinafter simply referred to as a purge quantity) (e.g., so as to supply the vapor fuel if a load of the engine is large) in accordance with the operating state of the engine.

On the other hand, there exists an internal combustion engine in which the air/fuel ratio is detected by use of an air/fuel ratio provided in an exhaust passageway of the internal combustion engine, and feedback control is executed to make the air/fuel ratio of the engine coincident with a theoretical air/fuel ratio. In this internal combustion engine, air/fuel ratio learning and vapor fuel concentration learning are implemented for restraining an error in the air/fuel ratio due to deteriorations of the fuel injection valve and of the air/fuel ratio sensor with a passage of time, and also fluctuations in the air/fuel ratio which occur due to the error in the air/fuel ratio with a change in the concentration of the vapor fuel. For instance, Japanese Patent Application Laid-Open No.8-177572 discloses a contrivance that an air/fuel ratio correction quantity of the feedback control when the above two learning processes are not completed, is set larger than when these learning processes are completed.

In the conventional internal combustion engine, the air/fuel ratio sensor such as an oxygen sensor is disposed normally in the exhaust passageway, and an actual air/fuel ratio is detected based on an output signal of this sensor. Then, the fuel injection quantity etc is feedback-controlled so that the air/fuel ratio of the air/fuel mixture becomes a target air/fuel ratio specially calculated. At this time, even when the air/fuel ratio becomes rich with an execution of purging the vapor fuel, the feedback control is performed so that the air-fuel mixture comes to have the target air/fuel ratio. The oxygen sensor described above, however, makes such a detection that the target air/fuel ratio (A/F) is in the vicinity of, e.g., a theoretical air/fuel ratio (A/F=14.5). In the case of the lean-burn where the air/fuel ratio is larger than this theoretical air/fuel ratio, it is impossible to highly accurately detect a change in the air/fuel ratio due to the purging. Besides, it is impossible to precisely calculate an index (e.g., a concentration of the vapor fuel) for controlling the purge quantity of the vapor fuel which has hitherto been calculated from the output of the air/fuel ratio sensor in the prior art.

The reason for this is that since the accuracy of the air/fuel ratio sensor is not high in the lean-burn state, it is difficult to control the concentration learning in accordance with the air/fuel ratio in the lean-burn state, and it is impossible to obtain the purge quantity. As a result, especially during the operation, a concentration of the purging might change due to a purge-cut and a high-load operation. Hence, if the purging is executed in a state where the purge quantity (concentration) is unobvious, the combustible air-fuel mixture in the vicinity of the spark plug becomes excessively rich during, e.g., a stratified charge combustion operation, and there might be a possibility in which an misfire occurs, and the combustion becomes unstable.

SUMMARY OF THE INVENTION

It is a primary object of the present invention to provide an apparatus for detecting a concentration of vapor fuel in a lean-burn internal combustion engine, which is capable of surely detecting a concentration of a vapor fuel.

It is another object of the present invention to provide an apparatus for controlling a supply of a vapor fuel in a lean-burn internal combustion engine, which is capable of restricting a rich misfire etc without deteriorating a calculation of a supply quantity of the vapor fuel by utilizing the vapor fuel concentration detecting apparatus.

To accomplish the objects given above, according to a first aspect of the invention, in an internal combustion engine comprising a purge passageway for purging, into an intake system, a vapor fuel generated from fuel storing module for storing the fuel of the internal combustion engine, a purge control module for controlling a quantity of the vapor fuel introduced into the intake system from the purge passageway in accordance with an operating state of the internal combustion engine, and a combustion control module for switching over a homogeneous combustion operation and a lean-burn operation in accordance with the operating state of the internal combustion engine, an apparatus for detecting a concentration of a vapor fuel in a lean-burn internal combustion engine, comprises a module for switching over, when detecting the concentration of the vapor fuel during the lean-burn operation of the internal combustion engine, to the homogeneous combustion operation from the lean-burn operation, and detecting the concentration of the vapor fuel under the homogeneous combustion operation.

According to a second aspect of the invention, in an internal combustion engine comprising, a purge passageway for purging, into an intake system, a vapor fuel generated from fuel storing module for storing the fuel of the internal combustion engine, a purge control module for controlling a quantity of the vapor fuel introduced into the intake system from the purge passageway in accordance with an operating state of the internal combustion engine, and a combustion control module for switching over a homogeneous combustion operation and a lean-burn operation in accordance with the operating state of the internal combustion engine, an apparatus for detecting a concentration of a vapor fuel in a lean-burn internal combustion engine, comprises a module for detecting the concentration of the vapor fuel when the internal combustion engine is switched over to the homogeneous combustion operation from the lean-burn operation.

According to a third aspect of the invention, as an applied apparatus of the detecting apparatus according to the first aspect, an apparatus for controlling a supply of a vapor fuel in a lean-burn internal combustion engine, comprises a purge passageway for purging, into an intake system, a vapor fuel generated from fuel storing module for storing the fuel of the internal combustion engine, a purge control module for controlling a quantity of the vapor fuel introduced into the intake system from the purge passageway in accordance with an operating state of the internal combustion engine, a concentration learning module for detecting the concentration of the vapor fuel purged by the purge control module into the intake system, and a combustion control module for switching over a homogeneous combustion operation and a lean-burn operation in accordance with the operating state of the internal combustion engine. The concentration learning module includes a learning judging module for judging whether or not the vapor fuel concentration is required to be learned during the lean-burn operation of the internal combustion engine, and an operation switch-over module for switching over the internal combustion engine from the lean-burn operation to the homogeneous combustion operation when the learning judging module judges that the concentration learning is required, wherein the concentration of the vapor fuel is learned under the homogeneous combustion operation.

The case where it is required that the concentration of the vapor fuel be learned by the concentration learning module, may be a case in which the concentration learning is required in order for the purge control module to determine a control quantity when controlling the quantity of the vapor fuel. The control of the vapor fuel quantity is needed for determining a final fuel injection quantity and controlling the air/fuel ratio.

Herein, the vapor fuel supply controlling apparatus further comprises a target air/fuel ratio control module for controlling the operation so that an air/fuel ratio becomes a target air/fuel ratio when in the homogeneous combustion. The concentration learning module may execute the learning of the concentration of the vapor fuel under a target air/fuel ratio control operation.

Further, the learning judging module may predict a change of a state of the vapor fuel, and judge from the predicted change thereof whether a necessity for the learning arises or not.

The change in the state of the vapor fuel implies changes in the quantity and the concentration of the vapor fuel. These changes are predicted based on an internal fuel tank pressure, a temperature of a fuel tank, a purge-cut or non-purge-cut and a load of the engine (an operating state). If the intra fuel tank pressure and the temperature of the fuel tank are high, it is predicted that the concentration of the vapor fuel is rich. In the case of the purge-cut being effected, it is predicted that the vapor fuel is accumulated in the purge passageway during the purge-cut, and hence the concentration of the vapor fuel is rich. Further, if the engine load is high, the tank temperature rises. Therefore, when the engine load is high, it is predicted that the vapor fuel has a high concentration.

According to a fourth aspect of the invention, as an applied apparatus of the apparatus according to the second aspect, an apparatus for controlling a supply of a vapor fuel in a lean-burn internal combustion engine, comprises a purge passageway for purging, into an intake system, a vapor fuel generated from fuel storing module for storing the fuel of the internal combustion engine, a purge control module for controlling a quantity of the vapor fuel introduced into the intake system from the purge passageway in accordance with an operating state of the internal combustion engine, a concentration learning module for detecting the concentration of the vapor fuel purged by the purge control module into the intake system, and a combustion control module for switching over a homogeneous combustion operation and a lean-burn operation in accordance with the operating state of the internal combustion engine. The concentration learning module, when switched over to the homogeneous combustion operation from the lean-burn operation in accordance with the operating state, performs the learning of the concentration of the vapor fuel under the homogeneous combustion operation.

The vapor fuel supply controlling apparatus may further comprise a target air/fuel ratio control module for controlling the operation so that an air/fuel ratio becomes a target air/fuel ratio when in the homogeneous combustion. The concentration learning module may execute the learning of the concentration of the vapor fuel under a target air/fuel ratio control operation.

Herein, when switched over to the homogeneous combustion operation from a state of the lean-burn operation depending on some sort of operating condition, particularly when switched over to the target air/fuel ratio control operation based on the air/fuel ratio sensor, the concentration of the vapor fuel is detected and learned. In other words, it never happens that the concentration of the vapor fuel is detected during the lean-burn, there must be no possibility in which an incorrect value of the concentration is learned.

In the vapor fuel supply controlling apparatus according to the third and fourth aspect of the invention, the combustion control module may change a state of the fuel injection in accordance with the concentration of the vapor fuel. Herein, the state of the injection embraces an injection quantity, an injection timing and an injecting direction of the injection valve.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 13(b) is a graphic chart showing a relationship of a maximum target purge rate to a purge execution time;

FIG. 16 is a flowchart showing the switching operation in greater details in FIG. 15.

DESCRIPTION OF THE PREFERRED EMBODIMENTS

Embodiments of the present invention will hereinafter be described in details with reference to the accompanying drawings.

First Embodiment

<Outline of Construction of System>

Figure 1:
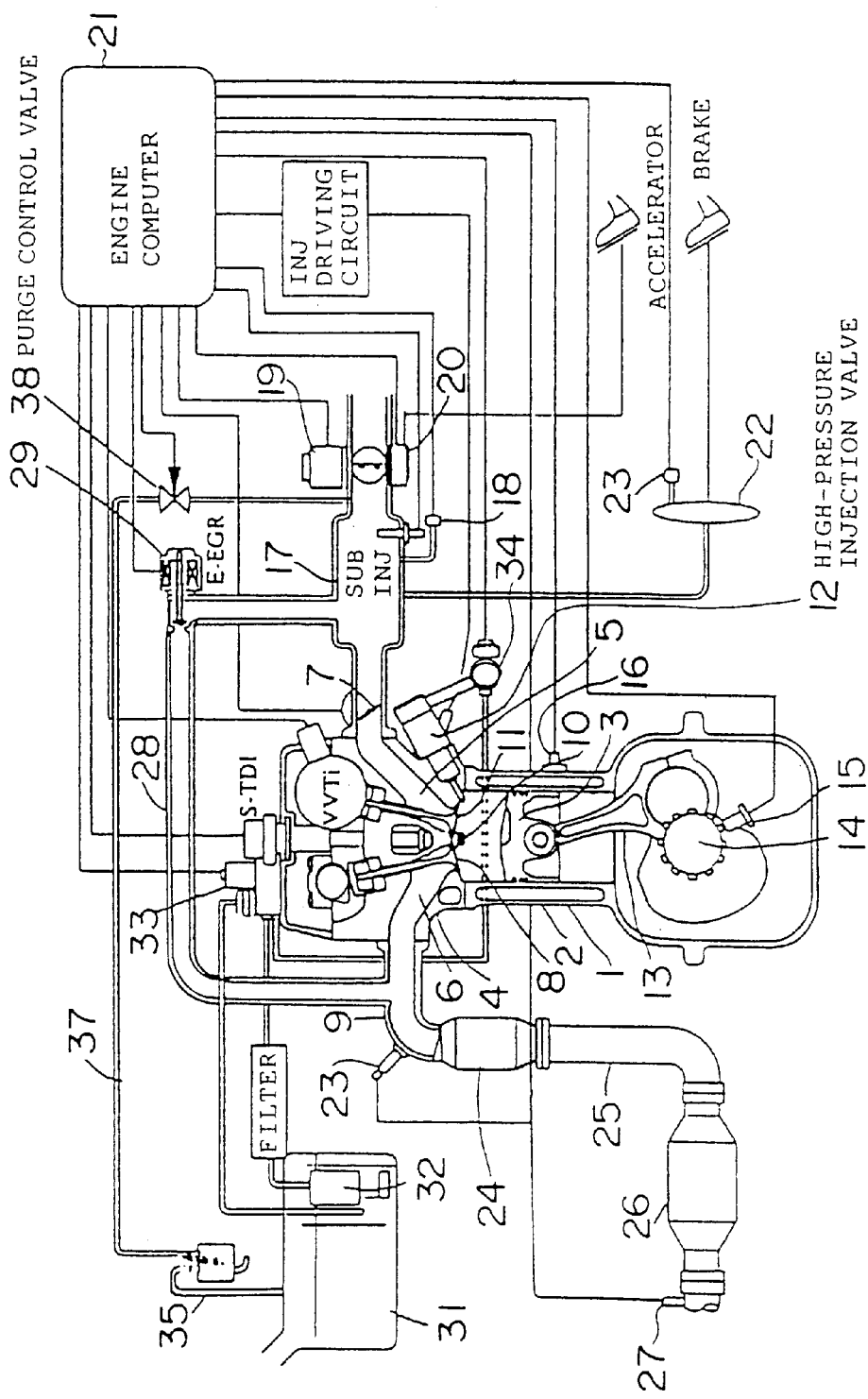
FIG. 1 is a conceptual diagram showing a basic construction of a direct injection type lean-burn internal combustion engine according to the present invention.

FIG. 1 is a view showing an outline of a direct injection internal combustion engine according to the present invention. Referring to FIG. 1, an internal combustion engine 1 includes a piston 3 provided within a cylinder 2, an a cylinder head 4 which closes an edge surface of the cylinder 2 is provided with two intake ports 5 and two exhaust ports 6. The first intake port 5 is, though not clearly illustrated in FIG. 1, classified as a helical intake port, and the second intake port 5 is classified as a straight port extending substantially straight. An intake pipe extending to the helical intake port is provided with a swirl control valve 7. Further, each exhaust port, to which an exhaust manifold 9 is connected, is provided with an exhaust valve 8. Further, a spark plug 10 is disposed at the center of an inner wall surface of the cylinder head 4. Moreover, each intake port 5 is provided with first and second intake valves 11, and a fuel injection valve 12 serving as a fuel supply device is disposed on a peripheral portion of the inner wall surface of the cylinder head 4 in the vicinity of each of the intake valves 11. Namely, in the embodiment 1, a fuel is injected from the fuel injection valve 12 directly into the cylinder. Then, as known well, the injected fuel is ignited by a spark plug 10, and the piston is thereby reciprocated. This reciprocating motion makes a crank shaft 14 rotate through a crank arm 13. Then, an angle of rotation is detected by a crank angle sensor 15 provided at the crank shaft 14. Further, a temperature of cooling water within a cooling water passageway is detected by a cooling water temperature sensor 16 provided at the cylinder.

The intake valve 11 is controlled by a variable valve timing mechanism which consecutively variably controls a phase of an intake valve cam shaft in accordance with a state of the engine.

A surge tank 17 for restricting intake pulsations is so provided as to be connected to the intake pipe 5. The surge tank 17 is provided with an intake pressure sensor 18. Further, an electronic throttle 19 is disposed upstream of the surge tank 17. An aperture of this electronic throttle 19 is controlled by a computer 21 in accordance with a pedaling quantity of an accelerator pedal which is detected by an accelerator sensor 20. Furthermore, an intake negative pressure in the surge tank 17 is applied to a brake booster 22, and serves to help a brake pedal effort. The brake booster 22 is provided with a negative pressure sensor 23 for detecting a booster internal pressure.

A first oxygen sensor 23 serving as an air/fuel ratio sensor for detecting an air/fuel ratio by detecting a concentration of oxygen contained in an exhaust gas, is fitted to the exhaust manifold 9, and a three-way catalyst 24 is provided downstream of the sensor 23. Further, an NOx storage-reduction three-way catalyst 26 is provided through the exhaust pipe 25. A second oxygen sensor 27 is also provided downstream of the NOx storage-reduction three-way catalyst 26.

The exhaust pipe communicates via an EGR pipe 28 with the intake pipe, and an EGR valve 29 constructed of an electromagnetic valve is provided midways of the EGR pipe 28. Then, EGR control is executed by opening and closing this EGR valve.

Provided further is a fuel pump 32 for supplying the fuel stored in 4 fuel tank 31. The fuel fed from the fuel pump 32 is highly pressurized by a high-pressure fuel pump 33 and supplied via a high-pressure delivery pipe to the fuel injection valve 12. The high-pressure delivery pipe is provided with a fuel pressure sensor 34, and a force feed quantity of the fuel is compensated by a fuel pressure detected by this fuel pressure sensor 34.

Provided also is a canister 35 for preventing the fuel (vapor) evaporated out of the fuel tank 31 from being released out in the atmospheric air.

Figure 2:
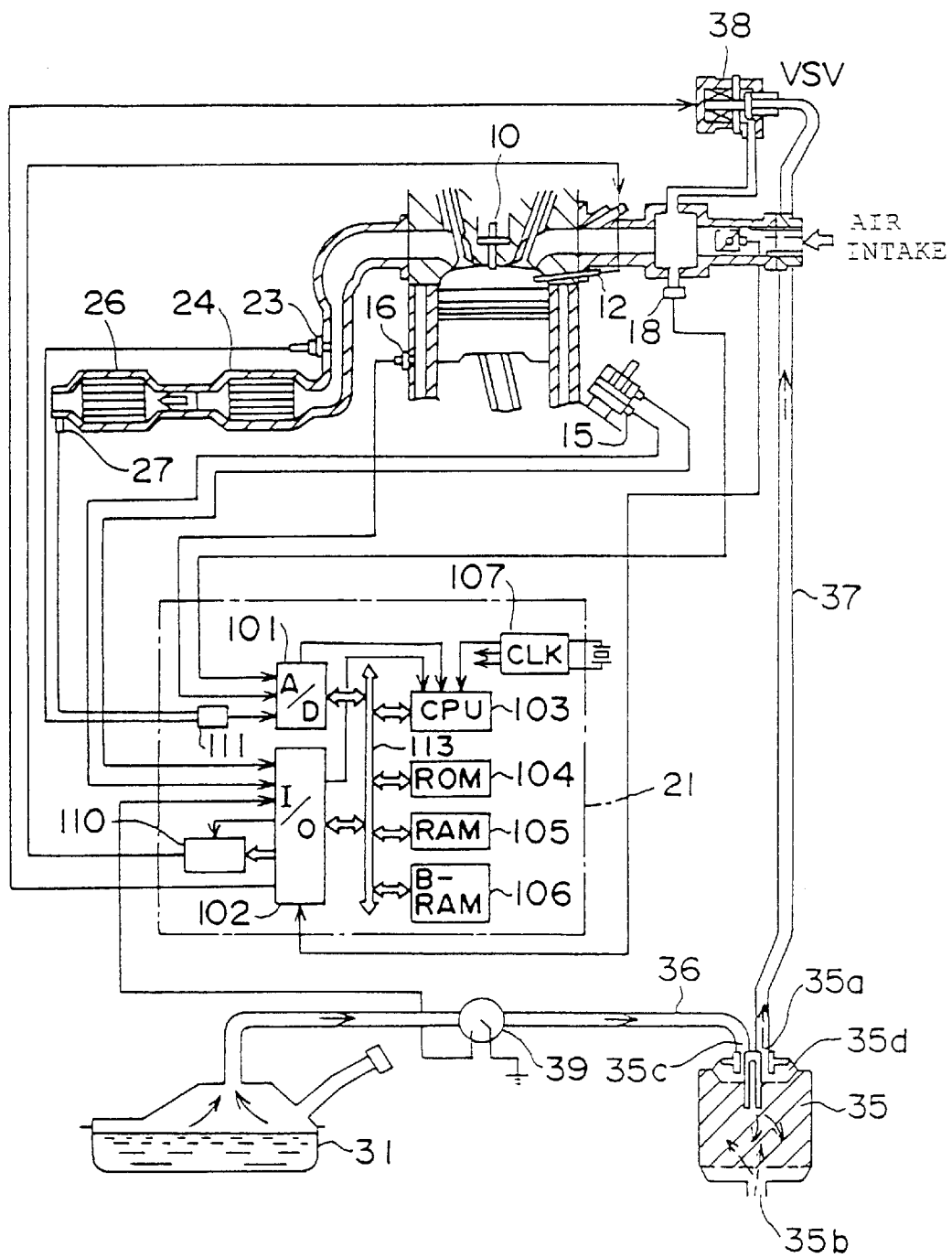
FIG. 2 is a second conceptual diagram showing a basic construction of the internal combustion engine according to the present invention.

A structure of the canister is explained in greater details referring to FIG. 2.

The canister 35 is filled inside with an absorbent such as activated carbon. Further, the canister 35 has a purge port 35a, an atmospheric air port 35b and a tank port 35c. The purge port 35a communicates via a relay chamber 35d with the tank port 35c within the canister 35. The tank port 35c of the canister 35 is connected to a raised bottom of the fuel tank 31 through a vapor collecting pipe 36, thereby adsorbing the vapor evaporated from the fuel tank 31. The atmospheric air port 35b of the canister 35 is open to the atmospheric air, and the purge port 35a is connected via a purge passageway 37 to the surge tank on the intake passageway through a purge control valve 38. The purge control valve 38 duty-controls a quantity of the purge vapor fed to the intake passageway in accordance with an operating state of the internal combustion engine.

Provided midways of the vapor collecting pipe 36 is a tank internal pressure control valve 39 which opens when a vapor pressure within the fuel tank 31 is over a predetermined pressure. A switch is fitted to this internal pressure control valve 39, of which opening/closing conditions are inputted to the computer 21. The internal combustion engine 1 shown in FIGS. 1 and 2 is controlled by the engine computer 21. Connected via an A/D converter 101 to this engine computer 21 are the crank angle sensor 15, the cooling water temperature sensor 16, the intake pressure sensor 18, the accelerator sensor 20 (the throttle aperture sensor), the brake booster oriented negative pressure sensor 23, the oxygen sensors 23, 27, and the fuel pressure sensor 34. Pieces of information from these respective sensors are inputted to the engine computer 21.

Connected further via an I/O interface 102 to the engine computer 21 are a swirl control valve 7, an ignition coil for applying an electric current to the spark plug 10, the fuel injection valve 12, the variable valve timing mechanism, the electronic throttle 19, the EGR valve 29, the high-pressure fuel pump 33 and the purge control valve 38, which are all controlled by the computer 21 on the basis of the information given from the variety of sensors.

Note that the fuel injection valve 12 is drive-controlled by a fuel injection control circuit 110 connected to the I/O interface 102. This injection control circuit 110 includes, though not illustrated, a down-counter, a flip-flop and a drive circuit. Then, in the injection control circuit 110, a fuel injection quantity TAU and a fuel injection timing, which are calculated by a fuel injection control program which will be described later on, are preset in the flip-flop of the fuel injection control circuit 110 as well as being preset in the down-counter thereof. The drive circuit starts energizing the fuel injection valve in accordance with the set fuel injection timing.

On the other hand, the down-countermeasures clock signals, and finally a carry-out terminal thereof comes to assume a level 1", at which time the flip-flop is reset and the drive circuit stops energizing the fuel injection valve 12. That is, the fuel injection valve is energized by a fuel injection quantity TAU, and such an amount of fuel is fed into the fuel chamber of the internal combustion engine.

A signal from the crank angle sensor 15 is used for generating a fuel injection timing interrupt request signal, a reference timing signal of the ignition timing and a fuel injection quantity calculation control interrupt request signal.

A signal from the cooling water temperature sensor 16 is used for judging whether or not the engine is in a cold operation, or whether overheated or not.

The intake pressure sensor 18 detects a negative pressure of the intake pipe, and this intake pipe negative pressure is used for calculating an intake air quantity. Note that the intake pipe may be provided with an airflow meter for detecting the intake air quantity.

The accelerator sensor 20 detects a pedaling quantity of the accelerator pedal, and the opening/closing control of the electronic throttle and the fuel injection control are executed based on this pedaling quantity.

The brake booster oriented negative pressure sensor 23 detects a pressure within the brake booster, and this detected pressure is used for the brake control etc.

The first and second oxygen sensors 23, 27 generate electric signals corresponding to a concentration of an oxygen content in the exhaust gas. The first oxygen sensor 23 supplies the A/D converter 101 with an output signal corresponding an actual; air/fuel ratio a signal processing circuit 111. Through the signal processing circuit, the second oxygen sensor 27 supplies the A/D converter 101 with an output signal becoming different corresponding to whether the air/fuel ratio is on a rich-side or a lean-side with respect to a theoretical air/fuel ratio.

The fuel pressure detected by the fuel pressure sensor 34 is utilized for the variable fuel pressure control for optimizing the fuel pressure in accordance with the operating condition.

The computer described above includes, in addition to the A/D converter 101, the I/O interface 102 and the CPU 103, a ROM 104 stored with a control program, a RAM 105 to which a result of calculation etc is written, a backup RAM 106 for backing up the data, and a clock (CLK) 107 for controlling an arithmetic timing of the computer 21, which are connected through a bus 113.

<Various Control Modules Actualized on Computer>

Actualized by executing the control program are a combustion control module for controlling a combustion states such as an homogeneous combustion operation and a lean-burn operation (a stratified charge combustion operation), a purge control module for controlling, when the vapor fuel adsorbed to the canister is introduced into the intake system via the purge passageway, a quantity of the introduced vapor fuel in accordance with an operation state of the internal combustion engine, and a concentration learning module for learning a concentration of the vapor fuel in the purge gas.

The concentration learning module includes a learning judging module for judging whether or not the vapor fuel concentration is required to be learned during the lean-burn operation of the internal combustion engine. The case where the vapor fuel concentration is required to be learned, may include a case where it is necessary fr learning the concentration thereof in order to determine a control quantity when the purge control module controls the vapor fuel quantity, and so on. The case of requiring the learning of the concentration may include a case where the purging is implemented, and the concentration changes when the purging resumes.

Further, the concentration learning module has an operation switching module for switching the operation of the internal combustion engine from the lean-burn operation to a target air/fuel ratio control operation in which the operation control is performed to obtain a target air/fuel ratio, wherein the concentration of the vapor fuel is learned under the target air/fuel ratio control operation.

The learning judging module is capable of predicting a change of state of the vapor fuel, and making a judgement as to a necessity for learning on the basis of the predicted change.

<Operation of Direct Injection Internal Combustion Engine in Present Embodiment>

Figure 3:
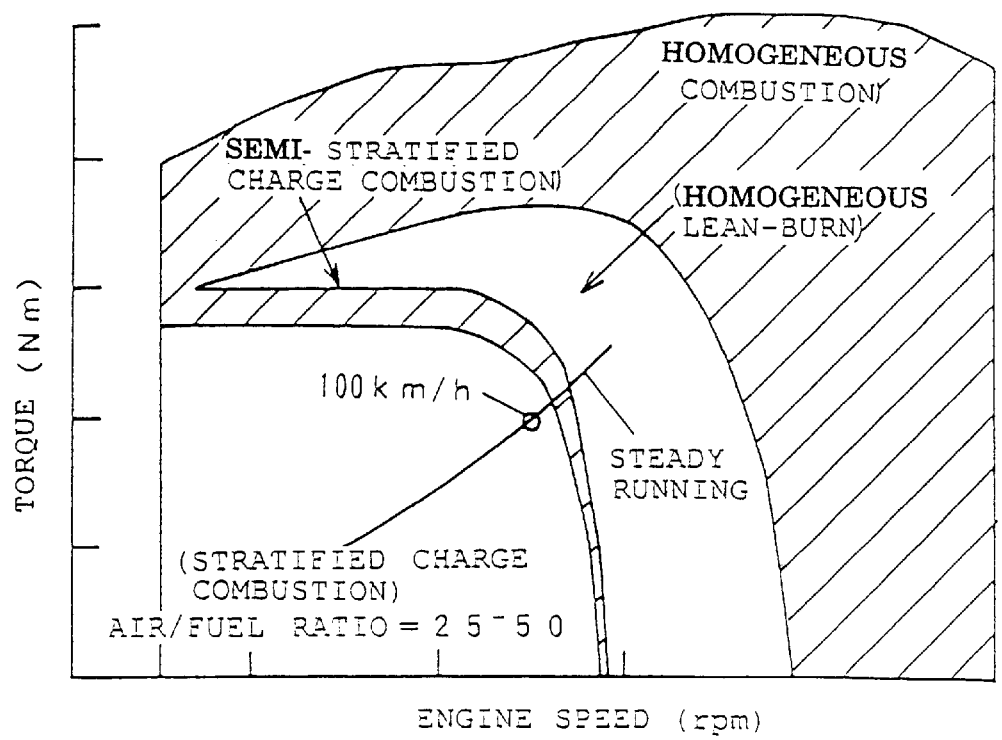
FIG. 3 is a diagram showing a relationship between a engine speed, a torque and a combustion method.

In the internal combustion engine in the first embodiment, as shown in FIG. 3, the combustion control module controls the stratified charge combustion (the lean-burn) and the homogeneous combustion.

The combustion control module performs the stratified charge combustion (lean: lean-burn) in a low-middle rotating region and in a low-middle load region. Further, the combustion control module implements the homogeneous combustion (the theoretical air/fuel ratio, or rich) in a high-rotation/high-load region. Moreover, each combustion state has a combustion mode of an original homogeneous combustion in which the operation is carried out at a theoretical air/fuel ratio and an air/fuel ratio richer than the theoretical A/F ratio, and a combustion mode of a homogeneous lean-burn (homogeneous lean) which is, though homogeneous, slightly leaner than the original homogeneous combustion, with respect to the homogeneous combustion and a semi-stratified charge combustion exhibiting a slightly richer air/fuel ratio than in the stratified charge combustion.

Figure 4:
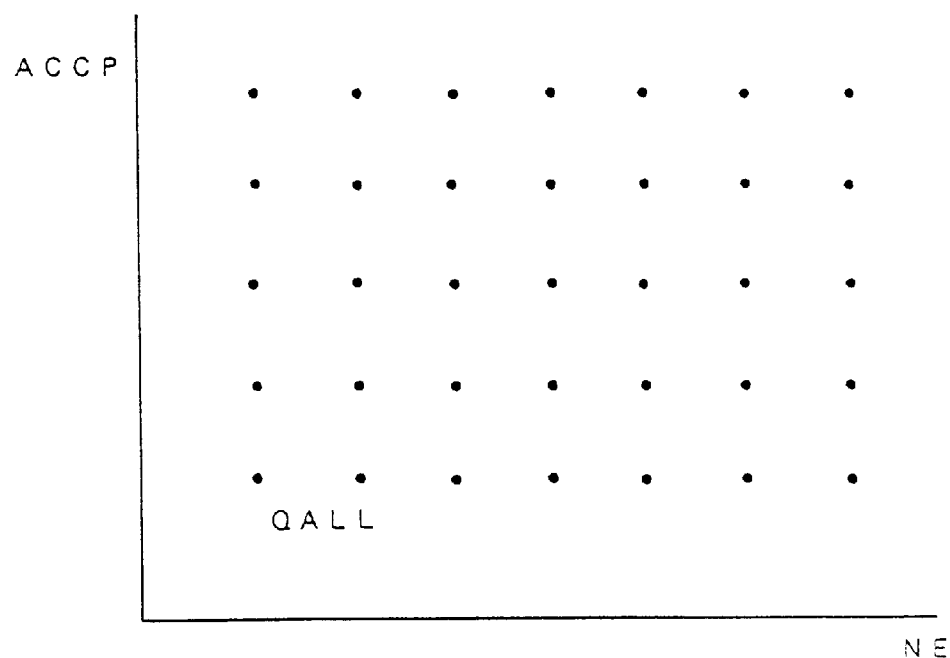
FIG. 4 is a diagram showing a map for setting a basic combustion injection quantity QALL in a T-J system.

In the stratified charge combustion engine, there is a large amount of air in a light-load region, and, even when the load may change, the quantity of intake air does not change so much. It is therefore difficult to judge how the load changes on the basis of the intake air quantity. Such being the case, the engine in the first embodiment is constructed so that a basic fuel injection quantity (QALL) is determined based on an accelerator aperture ACCP and a engine speed NE as shown in FIG. 4 in the low-middle load region (T-J system). On the other hand, when in the high-load region, when in a cold operation, when in a rich spike and when in a brake negative pressure ensuring control, as in the case of the prior art engine, the intake air quantity is calculated from the negative pressure in the intake pipe, and the fuel injection quantity is determined based on the intake air quantity and the number of revolutions (D-J system). In the operation by the D-J system, there is executed air/fuel ratio feedback control in which the theoretical air/fuel ratio is set to a target value.

In the thus constructed internal combustion engine, when the ignition is switched ON, to begin with, a warm-up operation is started based on the D-J system operation. In the warm-up operation, a so-called warm-up quantity increasing process is effected, wherein the injection fuel quantity is increased. The warm-up quantity increasing process continues to be implemented till a temperature of the cooling water rises from 60 degree up to 70 degrees. Initially, the fuel quantity is simply increased in an open-loop way. When the temperature rises to some extent enough to activate the air/fuel ratio sensor (the oxygen sensor), the air/fuel ratio feedback control is started.

After starting the D-J operation, upon a completion of the warm-up, the conditions of the T-J operation are established, and hence the operation shifts to the T-J operation defined as the stratified charge combustion under a low-load condition. Herein, as shown in FIG. 4, the fuel injection quantity is selected while choosing a map corresponding to the accelerator aperture ACCP and the engine speed. In particular, as the intake air quantity and the load become larger, the map is shifted from a stratified charge combustion map to a semi-stratified charge combustion map, a homogeneous lean combustion map and a homogeneous combustion map. Simultaneously, the injection timing is switched over to a suction stroke injection from a compression stroke injection. Herein, the operation is shifted from the T-J operation to the D-J operation. When switched over to the homogeneous combustion from the stratified charge combustion, the control known as a-so-called two-stage injections is conducted, thereby restricting a torque shock in the course of the shift.

Figure 5:
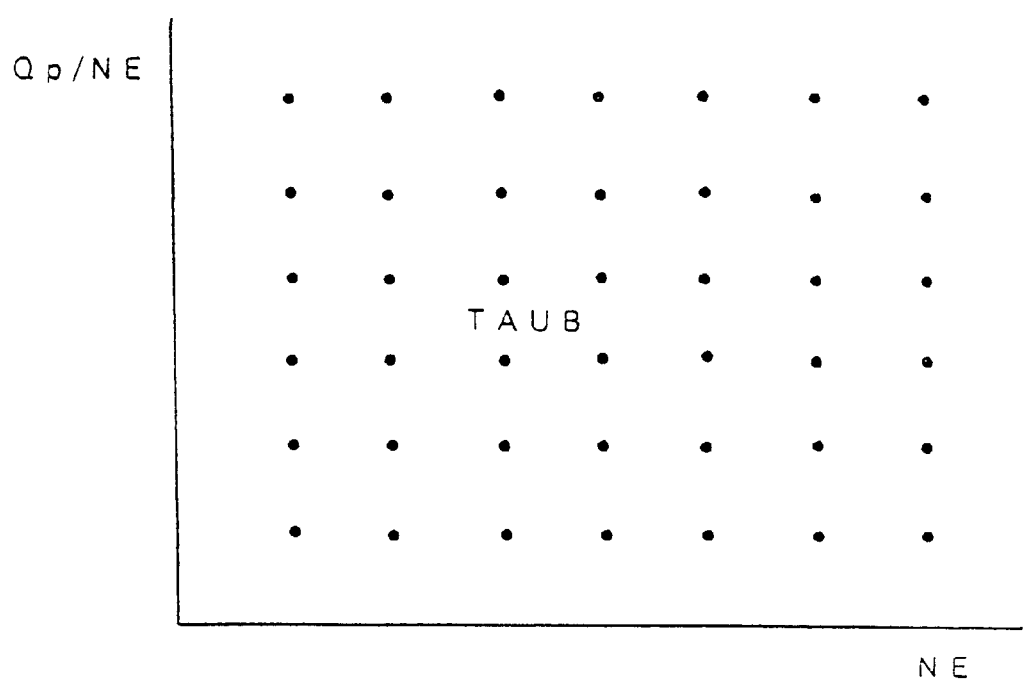
FIG. 5 is a diagram showing a map for setting a basic combustion injection quantity TAUB in a D-J system.
Figure 6:
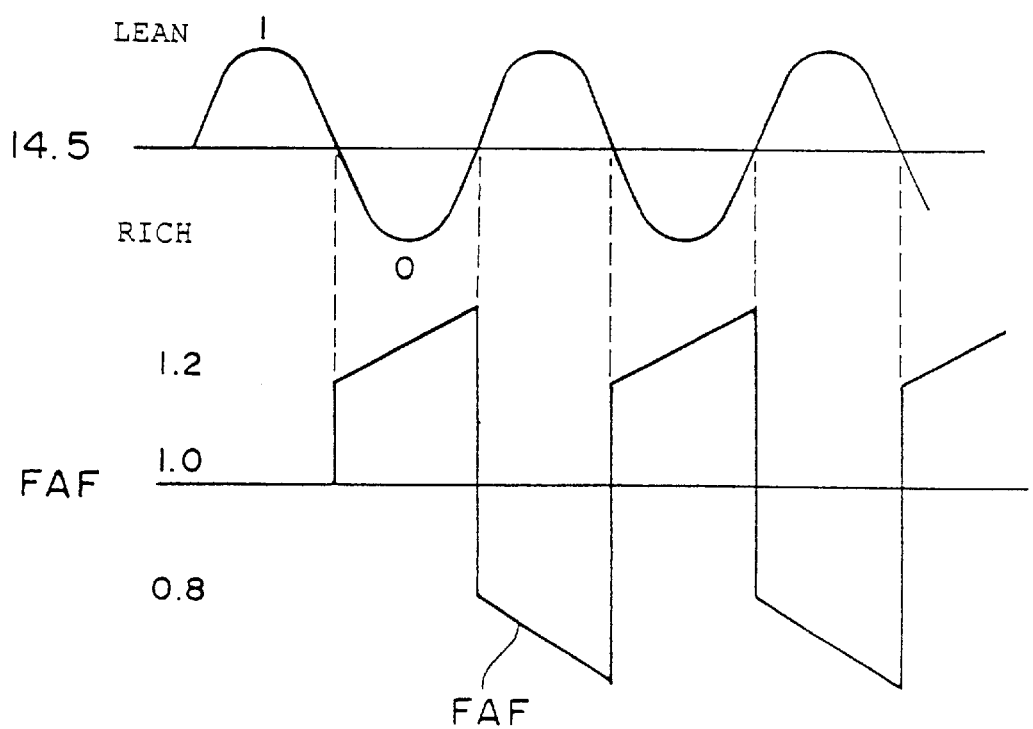
FIG. 6 is a graphic chart showing a relationship between an FAF signal and a detected value by a oxygen sensor under air/fuel ratio feedback control.

When shifted to the D-J operation, as shown in FIG. 5, there is referred to a map for determining the basic fuel injection quantity TAUB consisting of the engine speed NE and the engine load Q/N (air intake quantity Qp/number-of-rotations NE) from the intake air quantity Qp and the engine speed NE. Then, a signal of the air/fuel ratio sensor (the oxygen sensor 23) disposed upstream of the catalyst is picked up, and, as shown in FIG. 6, an air/fuel ratio feedback correction coefficient FAF is generated from the signal of the air/fuel ratio sensor. Subsequently, the basic fuel injection quantity is corrected, thus executing the control so as to be adjusted to a theoretical air/fuel ratio of 14.6 defined as a feedback value.

When changed from the high load to the low load, the map is selected in a reverse direction this time, and the injection quantity is controlled, or the injection timing is switched over from the suction stroke injection to the compression stroke injection.

Note that when the accelerator is returned after being accelerated, fuel cut control is carried out. When set at a lean A/F ratio immediately after having cut the fuel, it follows that the catalyst might be damaged. More specifically, if the oxygen enters in a high-temperature state, the catalyst falls into a higher-temperature state, and hence the operation is initially performed in the vicinity of the theoretical air/fuel ratio. Then, if large quantity of fuel is injected, the catalyst is cooled off, so that the operation is gradually returned to the stratified charge combustion operation after the feedback control has been carried out at the theoretical air/fuel ratio.

Since a large amount of NOx is produced in the stratified charge combustion, the exhaust pipe is provided with the Nox storage-reduction type catalyst 26 in order to remove NOx in the first embodiment. This NOx storage-reduction catalyst 26 occludes NOx therein when at the lean A/F ratio, and the rich spike control for setting the air/fuel ratio to the rich A/F ratio or the theoretical A/F ratio, whereby NOx occluded inside the catalyst is reduced and purified. Namely, after the stratified charge combustion has been started, a NOx counter executes an adding process, and it is assumed that NOx is brought into a saturated state just when the NOx counter reaches a predetermined value. Then, the rich spike control is effected, and the air/fuel ratio is set in a rich state, e.g., A/F=approximately 12. When NOx has been reduced, the counter is set to 0", and the operation again goes back to the stratified charge combustion.

Further, in the direct injection internal combustion engine, the operation is conducted in a state where the throttle valve is substantially fully opened. Then, the case of closing the throttle valve implies when ensuring, for example, a brake negative pressure of the brake booster. When implementing the rich spike control, the throttle valve is also slightly throttled for obtaining an air/fuel ratio such as A/F= approximately 12. When a sufficient negative pressure is ensured as in the case of obtaining the brake negative pressure, however, the throttle valve is not necessarily throttled.

During the operation described above, the purge control is executed in parallel. Te purge control is executed on conditions that the warm-up is completed, that there is completed a calculation of an intrinsic learning value, e.g., an air/fuel ratio learning value possessed by the engine and used for the air/fuel ratio feedback control etc, and that there is established a condition that a predetermined time has elapsed since the ignition was conducted. For instance, if these conditions are established, the purge control is to be performed when in the homogeneous combustion, i.e., in the D-J operation. A capacity of the canister is, however, limited. Hence, the purging is insufficient only when in the homogeneous combustion, and there might be a possibility in which the vapor fuel which could not be all grasped by the canister is released into the atmospheric air. Then, the purging is effected also when in the stratified charge combustion such as an idling time etc, and it is required that the capacity of the canister be ensured so that the canister is not saturated as much as possible.

If purged when in the stratified charge combustion, the basic fuel injection quantity is originally less than in the homogeneous combustion, and on the other hand the quantity of the fuel purged remains the same as that in the homogeneous combustion. Therefore, an influence exerted by fluctuations in the quantity of the vapor fuel contained in the purge gas, is greater in the stratified charge combustion than in the homogeneous combustion. This being the case, the control for stabilizing the combustion is needed in the case of purging when in the stratified charge combustion.

A purge gas flow rate can be approximately calculated from an aperture of a purge control valve and a negative pressure in the intake pipe. Hence, as far as the concentration of the vapor fuel contained in the purge gas is fixed, a vapor fuel quantity can be calculated. However, the concentration of the vapor fuel changes depending upon the operating state. For instance, it might happen that the fuel in the fuel tank is heated by a temperature of the outside air and heat of the engine etc. Further, in such a type that the fuel flows in circulation, a temperature of the fuel in the fuel tank rises due to the fuel heated on the side of the engine and flowing back to the fuel tank. As a result, the concentration of the vapor fuel increases. Further, the purging is stopped by closing the purge control valve in some cases. Thereupon, however, the vapor fuel is accumulated in the canister, and the concentration thereof increases. When the purge control valve is again opened after the vapor fuel has been thus accumulated, the purge gas exhibiting a high concentration initially flows out of the canister. At this time, if in the stratified charge combustion, there is an extremely high rich state where the air/fuel ratio A/F is 10 or under, resulting in such a possibility that a rich misfire might occur. What is given as a method of avoiding this misfire is a method of reducing the aperture of the purge control valve when the concentration increases, and a method of reducing the fuel injection quantity.

Then, the vapor fuel concentration learning is a matter of question, and, according to the prior art, the concentration is detected as follows. In the case of executing the purging more specifically when the internal combustion engine is steadily operated at the theoretical air/fuel ratio, a deviation quantity from the theoretical air/fuel ratio of the FAF signal is looked at from a value of the air/fuel ratio sensor during the D-J operation, and, if that is rich, an amount of being rich is assumed to be equivalent to the quantity of the fuel purged. Then, the concentration is detected as a fuel quantity per unit volume from the intake air quantity at that time.

By contrast, in the case of performing the purge control under the T-J operation, there arises a necessity for doing the vapor fuel concentration learning also in the lean region. In the lean state, however, the air/fuel ratio sensor does not work. That is, the air/fuel ratio sensor in the present situation is neither capable of detection on condition that the air/fuel ratio is 20 or under nor works in the stratified charge combustion in which the air/fuel ratio is over 30. Accordingly, it is impossible to generate the FAF signal, and it is difficult to detect and learn the purge concentration.

Then, if the purge concentration learning is required under the T-J operation, the operation is temporarily switched over to the D-J operation, and the concentration is learned.

The concentration learning control based on this switchover will hereinafter be explained in greater details.
<Calculation of Fuel injection Quantity (Time) TAU and Air/Fuel Ratio Control in D-J System>

To start with, the fuel injection control in the D-J system is explained in advance of the concentration learning. The fuel injection quantity TAU in the D-J system is calculated based on the following formula.

$$TAU = TAUB \times FW \times (FAF + KGX - FPG) \qquad (1)$$

where
 TAUB: the basic fuel injection quantity,
 FW: the basic correction quantity,
 FAF: the air/fuel ratio feedback correction coefficient
 KGX: air/fuel ratio learning value, and
  FPG: purge air/fuel ratio correction coefficient (the vapor fuel quantity correction quantity).

The basic fuel injection quantity TAUB is obtained by multiplying an engine load Q/N (Q: the air intake quantity, and N: the engine speed) by a conversion coefficient K for conversion into a fuel injection quantity corresponding to the engine load.

The basic correction quantity TFW is a correction quantity consisting of, e.g., a warm-up quantity increase coefficient when warming up the engine, an acceleration quantity increase coefficient when in acceleration, and a deceleration quantity decrease coefficient when in deceleration.

The air/fuel ratio feedback correction coefficient FAF is a correction coefficient for feedback-controlling a fluctuation in the air/fuel ration detected by the oxygen (the air/fuel ratio) sensor 23 to a target air/fuel ratio (e.g., a theoretical air/fuel ratio). Accordingly, when an air-fuel mixture exhibiting the target air/fuel ratio is burned, the coefficient FAF is 1.0. FIG. 6 shows a relationship between the air/fuel ratio detected by the oxygen sensor and FAF.

The air/fuel ratio learning value KGX is a correction coefficient for correcting the fuel injection quantity TAU by learning a deviation of the air/fuel ratio which is caused due to an individual difference of the engine and to a change with a passage of time.

The purge air/fuel ratio correction coefficient (the vapor fuel quantity correction quantity) FPG is a correction coefficient for correcting the deviation of the air/fuel ratio when the purge gas is introduced into the intake pipe. Hence, when the purging is not effected, this coefficient becomes such as FPG=0.

The computer 21 performs the air/fuel ratio feedback control on the basis of an output signal transmitted from the oxygen sensor 23. To be more specific, the computer 21 calculates the air/fuel ratio feedback correction coefficient FAF on the basis of the output signal from the oxygen sensor 23, and feedback-controls a fuel injection time (the fuel injection quantity) so that the air/fuel ratio becomes the target air/fuel ratio(e.g., the theoretical air/fuel ratio)

Figure 7:
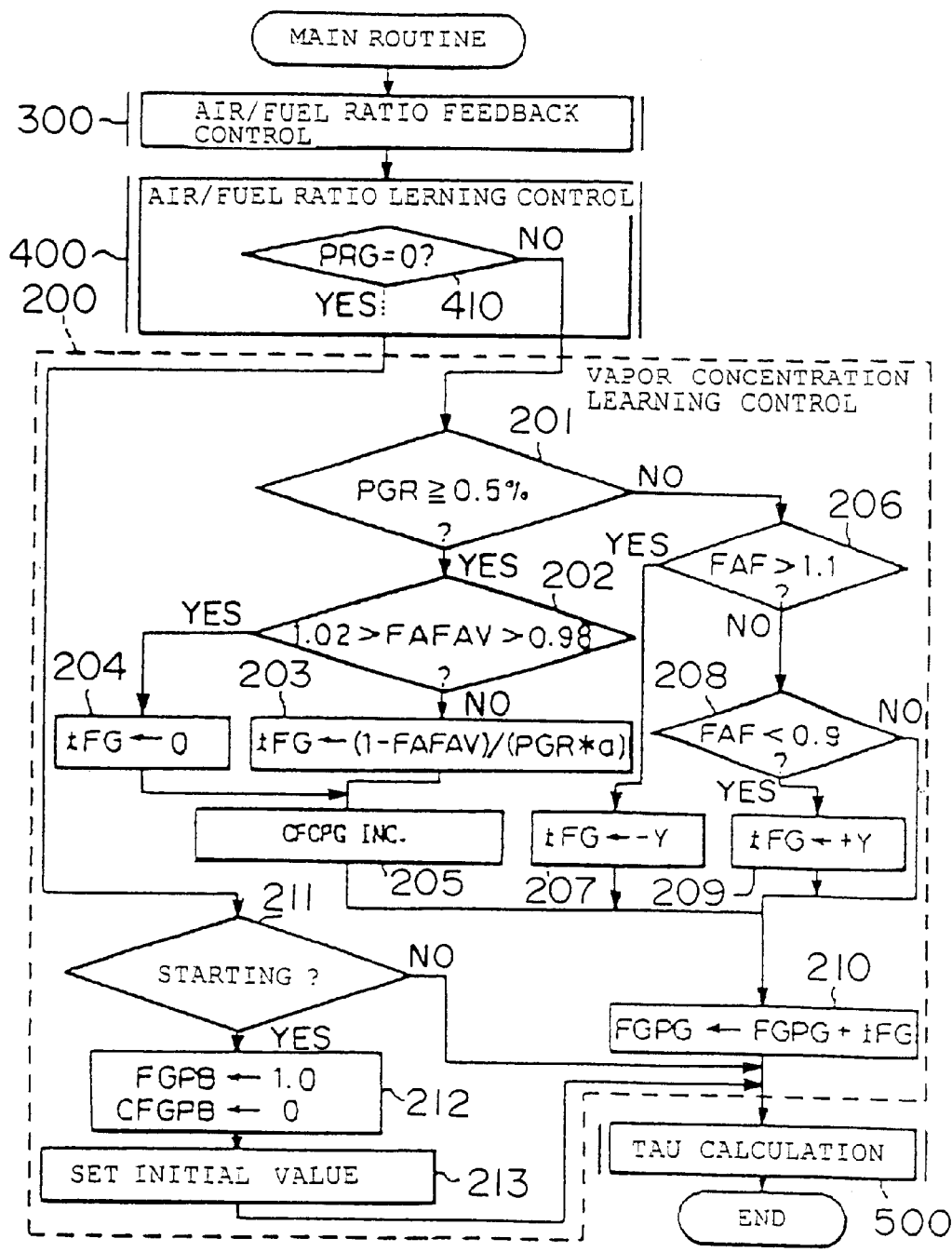
FIG. 7 is a flowchart showing air/fuel ratio control including vapor concentration learning control.

FIG. 7 shows a main routine related to the air/fuel ratio control under the D-J system.

The computer 21 executes the feedback-control of the air/fuel ratio in step 300, and, in subsequent step 400, performs learning control for obtaining the air/fuel ratio learning value KGX. Thereafter, the computer 21 make the concentration learning module implement vapor concentration learning control in step 200. After this vapor concentration learning control, the computer 21 calculates the fuel injection quantity TAU described above.

<Air/Fuel Ratio Feedback Control under D-J Operation>

Figure 8:
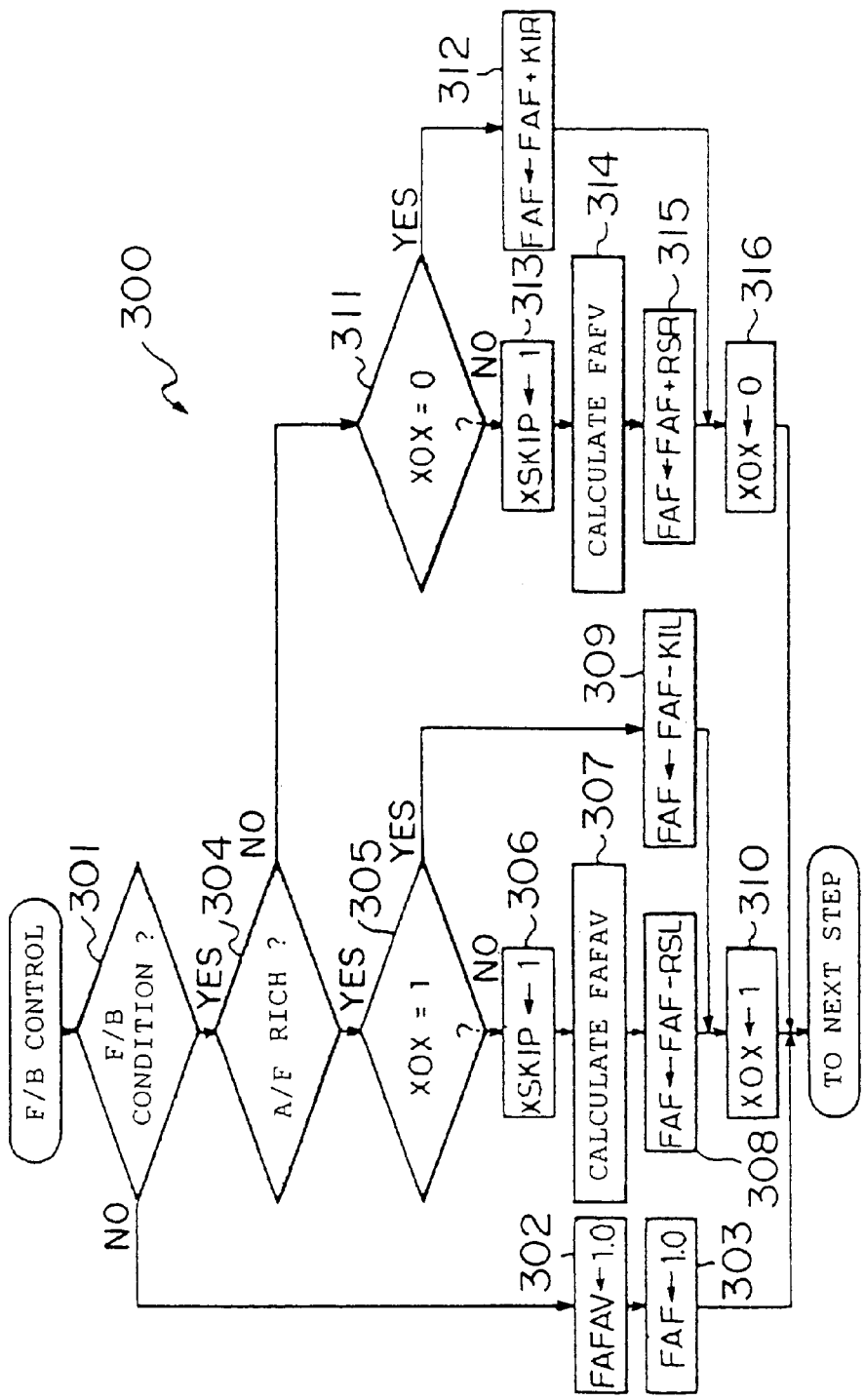
FIG. 8 is a flowchart showing the air/fuel ratio feedback control.

FIG. 8 shoes details of the air/fuel ratio feedback. At first, in step 301, the computer 21 judges whether or not a feedback condition is established. Requirements for establishing the feedback condition are the following four points. That is, the first point (1) is that the engine is not in the start-up process, the second point (2) is a state of being not in the process of cutting the fuel, the third point (3) is a state after completing the warm-up, and the fourth point (4) is that the activation of the air/fuel ratio is finished.

When judging in step 301 that the feedback condition is not established, the processing proceeds to step 302, wherein an average value FAFAV of the air/fuel ratio feedback correction quantities FAF is set to a reference value 1.0. In subsequent step 303, the air/fuel ratio feedback correction quantity FAF is set to the reference value 1.0, and this routine comes to an end.

While on the other hand, when judging in step 301 that the feedback condition is established, the processing proceeds to step 304, wherein it is judged whether or not the air/fuel ratio (A/F) is richer than the theoretical air/fuel ratio. If richer, the processing advances to step 305, in which it is checked whether a rich flag XOX is 1 or 0. The rich flag XOX indicates a result of the judgement about the air/fuel ratio when having judged last time. When the flag XOX is set to 1, it can be known that the air/fuel ratio is rich in the judgement of the last time, and, when set to 0, it can be also known that the air/fuel ratio is lean.

In a reverse case where the air/fuel ratio is lean last time while being rich this time, the processing proceeds to step 306, a skip flag XSKIP is set to 1 (XSKIP→1). In subsequent step 307, there is calculated the average value FAFAV of the air/fuel ratio feedback correction quantity FAF of the last time and the air/fuel ratio feedback correction quantity FAF of this time. Further, in step 308, the air/fuel ratio feedback correction quantity FAF is reduced skipwise by a predetermined skip value RSL.

Moreover, when judging in step 305 that the air/fuel ratio is rich last time also, the processing proceeds to step 309, wherein the air/fuel ratio feedback correction quantity FAF is integration-reduced by a predetermined integrated value KIL. Then, after finishing the steps 308 and 309 described above, the rich flag XOX is set to 1 in step 310 in order to indicate that the air/fuel ratio is rich last time, and this routine is finished.

When judging in step 304 that the air/fuel ratio is lean, the processing proceeds to step 310, in which it is judged whether or not the air/fuel ratio is lean last time also referring to the rich flag XOX.

In a reverse case where the air/fuel ratio is rich last time while being lean this time, in subsequent step 314, there is calculated the average value FAFAV of the air/fuel ratio feedback correction quantity FAF of the last time and the air/fuel ratio feedback correction quantity FAF of this time. Further, in step 315, the air/fuel ratio feedback correction quantity FAF is incremented skipwise by a predetermined skip value RSR.

When judging in step 311 that the air/fuel ratio is lean last time as in the case of this time, the processing proceeds to step 312, wherein the air/fuel ratio feedback correction quantity FAF is integration-incremented by a predetermined integrated value KIR. Then, after finishing steps 312 and 315, the rich flag XOX is set to 0 in step 316, thus storing a piece of data that the air/fuel ratio is lean last time. Then, this routine is finished. The above-described skip values RSL, RSR, and the integrated values KIL, KIR may be predetermined constants, or magnitudes of these constants may also be changed corresponding to output signals of the second oxygen sensor 27 provided downstream of the NOx occluded catalyst 26. Those constants have a relationship in their magnitudes such as RSL>>KIL, and RSR>>KIR.

<Air/Fuel Ratio Learning Control under D-J Operation>

Upon finishing the air/fuel ratio feedback control in step 200 as explained above, the processing advances to step 400, in which the air/fuel ratio learning module executes the air/fuel ratio learning control.

Figure 9:
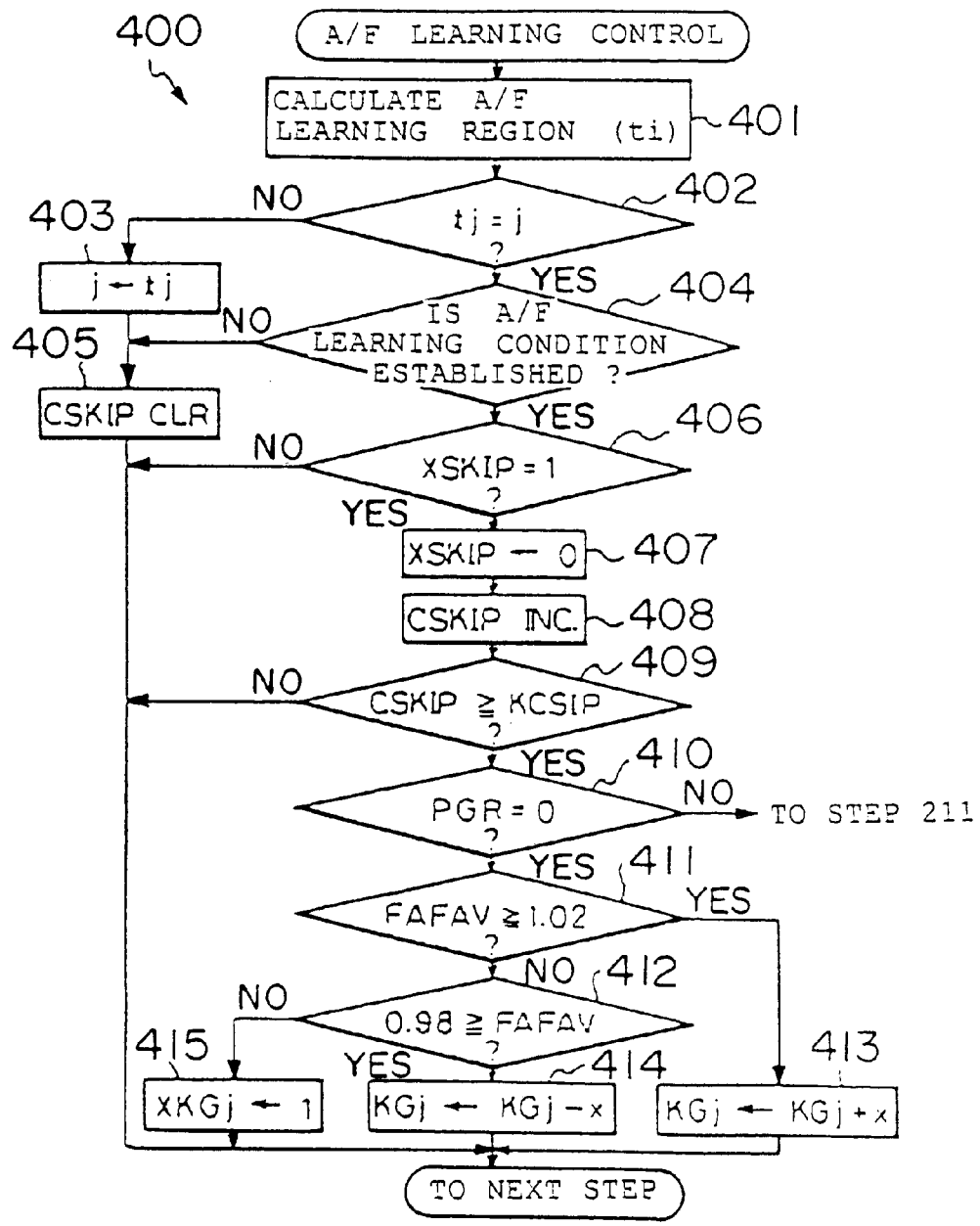
FIG. 9 is a flowchart showing air/fuel ratio learning control.
Figure 10:
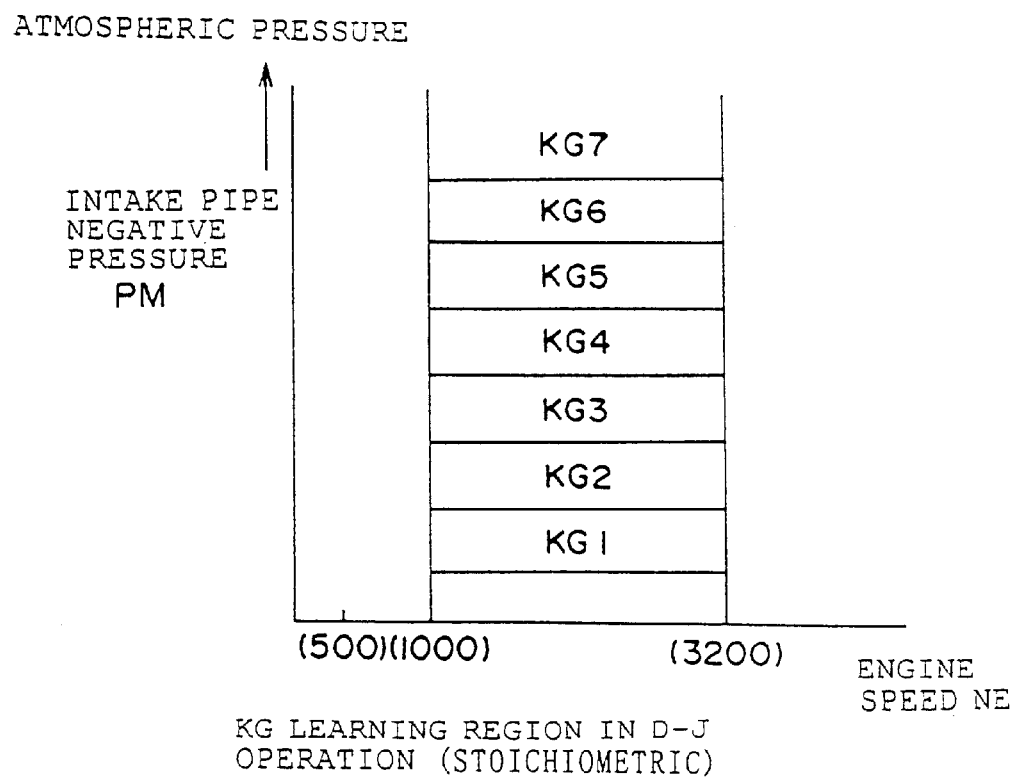
FIG. 10 is a diagram showing divided air/fuel ratio learning regions tj.

Referring to FIG. 9, to begin with, it is calculated in step 401 which predetermined air/fuel ratio learning region tj the present engine operating state exists in. This air/fuel ratio learning region tj is, as shown in FIG. 10, divided into, e.g., KG1–KG7 (tj1–tj7) according to a magnitude of the intake pipe pressure.

In subsequent step 402, it is judged whether or not the number j of the air/fuel ratio learning region tj obtained last time is the same as the air/fuel ratio learning region tj calculated this time. If judge to be negative in step 402, the air/fuel ratio learning region tj calculated this time in step 403 is stored as the air/fuel ratio learning region tj of the last time. In subsequent step 405, a counter CSKIP is cleared, and this routine is finished.

When judging in step 402 that the number j of the air/fuel ratio learning region obtained last time is the same as the air/fuel ratio learning region tj calculated this time, the processing proceeds to step 404, wherein it is judged whether or not the air/fuel ratio learning condition is established. Requirements for establishing the air/fuel ratio learning condition are the following three points which must be all satisfied. The first point (1) is a state of being in the process of the air/fuel ratio feedback. The second point (2) is that there is no increment in the air/fuel ratio feedback correction quantity, and the third point (3) is that a water temperature is over 80° C.

In the case of judging in step 404 that the air/fuel ratio learning condition is not established, the processing proceeds to step 405, in which the skip counter CSKIP is cleared, and this routine comes to an end.

If the air/fuel ratio learning condition is established, the processing advances to step 406. It is judged in step 406 whether or not the skip flag XSKIP is set to 1. When XSKIP=0, this routine is finished. When XSKIP=1, the skip flag XSKIP is set to 0in step 407, and thereafter a counter value of the skip counter CSKIP is incremented in step 408.

In subsequent step 409, it is judged whether or not the skip counter CSKIP indicates a counter value over a predetermined value, e.g., 3". If CSKIP is less than KCKIP, this routine is finished. If CSKIP is over KSCKIP, the processing advances to step 410. In the case of advancing to step 410, this indicates a state of being under the feedback control in the same air/fuel ratio learning region, and hence it is herein judged whether or not a purge ratFPGR is 0, i.e., whether or not the purging remains stopped.

When judging in step 410 that the purge rate is not 0, the processing proceeds to step 211 shown in FIG. 7. If the purge rate is 0, however, the processing goes forward to step 411, wherein it is judged whether or not the average value FAFAV of the air/fuel ratio feedback correction quantities is over a predetermined value (1.02 in the first embodiment). In subsequent step 412, it is checked whether or not the average value FAFAV of the air/fuel ratio feedback correction quantities is under a predetermined value (0.98 in the first embodiment). Namely, steps 411, 412 in the first embodiment are intended to judge whether or not the average value FAFAV of the air/fuel ratio feedback correction quantities has a deviation of 2% or larger.

When judging in step 411 that the average value FAFAV of the air/fuel ratio feedback correction quantities is larger by over 2%, the processing proceeds to step 413, in which a learning value KGJ in this learning region is incremented by a predetermined value x. When judging in step 412 that the average value FAFAV of the air/fuel ratio feedback correction quantities is smaller by over 2%, the processing proceeds to step 414, in which the learning value KGJ in this learning region is decremented by the predetermined value x. Then, when judging in steps 411, 412 that the average value FAFAV of the air/fuel ratio feedback correction quantities is less than±2%, the processing proceeds to step 415, wherein an air/fuel ratio learning completion flag XKGJ in this learning region is set. Then, this learning control routine is completed.

<Vapor Concentration Learning Control under D-J Operation>

Upon an end of the air/fuel ratio learning control in step 400, the processing diverts to step 200 this time, in which the vapor concentration learning control is carried out. In step 410 in FIG. 9, when judging that the purgFPGR is not 0, the processing proceeds to step 201 in FIG.7, in which it is judged whether or not the purge rate defined as a ratio of the intake air quantity to the vapor fuel quantity is over a predetermined value (which is herein 0.5%). When judging in step 201 that the purge rate is over 0.5%, the processing proceeds to step 202, wherein it is judged whether or not the average value FAFAV of the air/fuel ratio feedback correction quantities is within ±2%. Then, when 0.98<FAFAV<1.02, the processing advances to step 204, in which a vapor concentration updated value tFG is set to 0. Then, the processing proceeds to step 205. When FAFV≦0.98 or FAFV≦1.02, the processing advances to step 203. The vapor concentration updated value tFG per unit purge rate is obtained by the following formula:

$$tFG \leftarrow (1-FAFV)/(PGR \; c \; a) \qquad (2)$$

where
a: the constant (a constant for determining how much updating is done for a deviation of FAF, of which a value is normally on the order of 2).

Then, the processing advances to step 205.

In step 205, a counter value of a vapor concentration updating counter CFGPG is updated, and the processing proceeds to step 210.

While on the other hand, when judging in step 201 that the purge ratFPGR is less than 0.5%, the processing goes to step from step 206 onward, in which it is judged whether or not a deviation of the air/fuel ratio feedback correction quantity FAF is large. Herein, the deviation of the air/fuel ratio is set within ±10%. To be specific, it is judged in step 206 whether or not the air/fuel ratio feedback correction quantity FAF is over 1.1. It is judged in subsequent step 208 whether or not the air/fuel ratio feedback correction quantity FAF is under 0.9. Then, when FAF>1.1, the processing advances to step 207 from step 206, in which the vapor concentration updated value tFG is decremented by a predetermined value Y. Then, the processing proceeds to step 210.

Further, when FAF<0.9, the processing proceeds to step 208 from step 206, in which the vapor concentration updated value tFG is incremented by the predetermined value Y. Then, the processing advances to step 210. Further, when 0.9≦FAF≦1.1, the judgement is NO both in step 206 and in step 208. Hence, the processing proceeds directly to step 210. Thus, if the purge rate is extemely is small, a fluctuation quantity of the air/fuel ratio feedback correction quantity FAF is reflected in the updated value tFG of the vapor concentration FGPG, in which case an error in the vapor concentration FGPG becomes large. Accordingly, in this case that value is updated by a fixed small updated value Y only when the air/fuel ratio feedback correction coefficient FAF largely fluctuates with respect to 1.0.

In step 210, the vapor concentration updated value tFG is added to the vapor concentration FGPG, thus updating the vapor concentration FGPG. The processing advances to a next arithmetic routing for the fuel injection quantity TAU.

No purging is effected in the air/fuel ratio learning control in step 400, and the purge rate is 0, in which case the processing proceeds to step 211 from step 400. It is judged in step 211 whether or not the engine is in the process of being actuated. If the engine is not in the process of being actuated, the processing diverts directly to step 500. Whereas if the engine is in the process of being actuated, the processing proceeds to step 212. Instep 212, the vapor concentration FGPG is set to the reference value 1.0, and the vapor concentration updating counter CGPG is cleared. Then, the processing advances to step 213. In step 213, an initial value is set in other variables, and the processing diverts to step 500 shown in the Figure.

Figure 11:
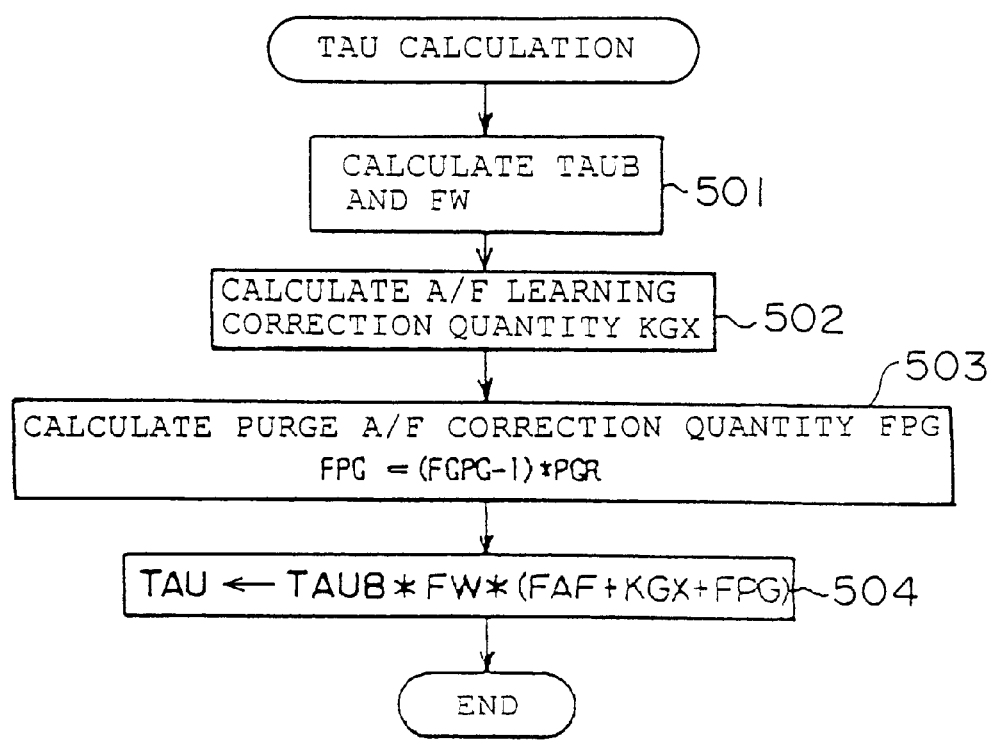
FIG. 11 is a flowchart showing the air/fuel ratio learning control.

In step 500, the fuel injection quantity TAU is calculated (see FIG. 11).

To start with, in step 501, the basic fuel injection quantity TAUB and a variety of basic correction quantities FW are calculated based on a rotating speed of the engine and an engine load which are stored as pieces of data.

Then, in subsequent step 502, an air/fuel ratio learning value KGX at the present pressure in the intake pipe is obtained from an air/fuel ratio learning value KGj in an adjacent learning region. Further in step 503, a purge air/fuel ratio correction quantity FPG is obtained by the following formula:

$$FPG=FGPG \times PGR \qquad (3)$$

Finally, in step 504, the fuel injection quantity TAU is calculated in accordance with the formula (1) described above, and the main routine is finished.

<Purge Control>

Figure 12:
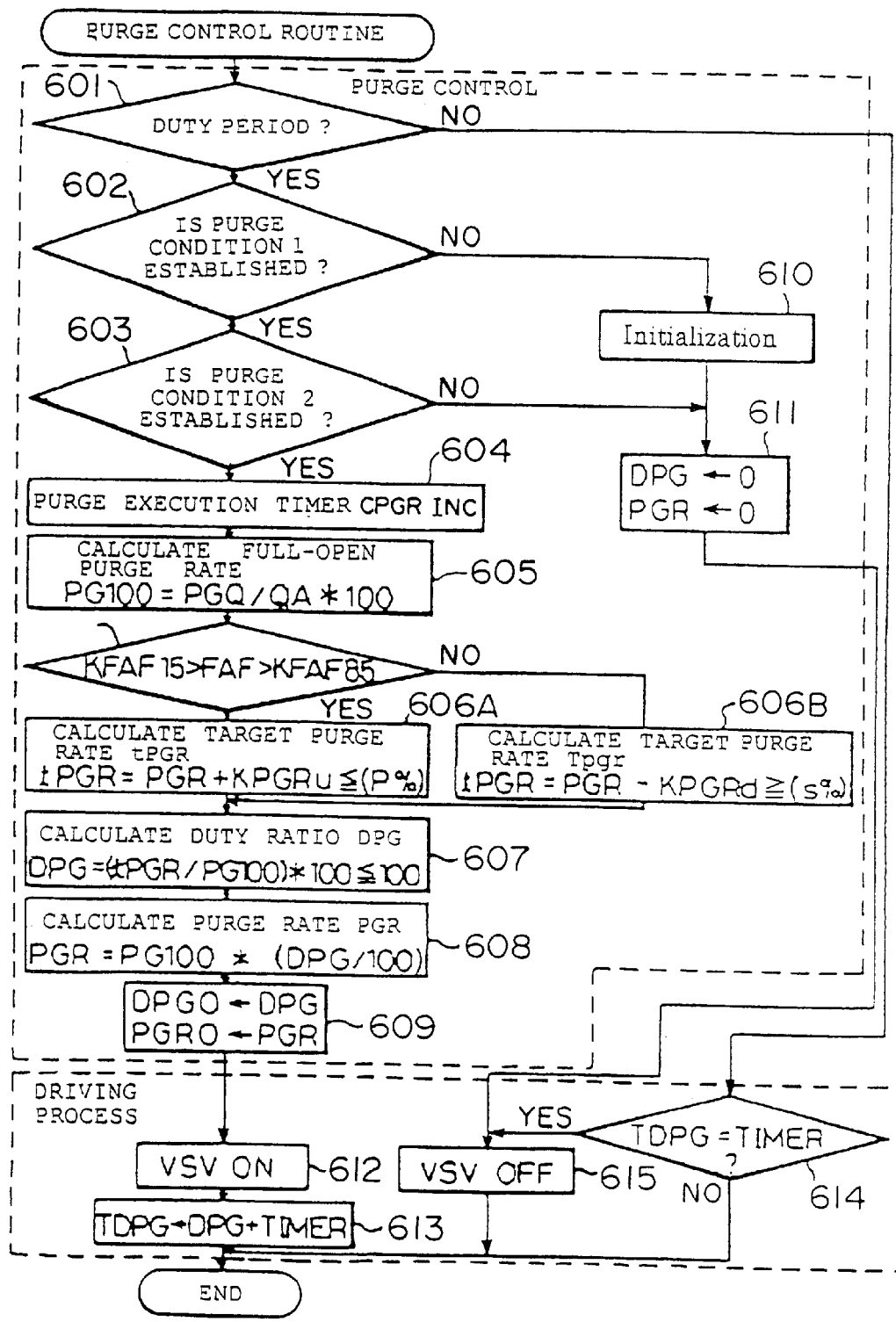
FIG. 12 is a flowchart showing purge control.

Next, the purge control is explained referring to FIG. 12. Note that the purge control is for the D-J operation.

It is judged in step 601 whether the period is a duty period or not. The duty period is a period with which the purge control valve 38 is duty-controlled, and is normally on the order of 100 ms. In step 601, if judged not to be the duty period, the processing proceeds to step 614, wherein it is judged whether or not the time is an end-of-electrification time TDPG of the purge control valve 38 referring to TDPG=TIMER. If TDPG=TIMER is not established, the routine is directly finished. Whereas if TDPG=TIMER is established, the processing proceeds to step 615, in which the purge control valve is switched OFF by stopping the electrification thereof.

While on the other hand, in step 601, if judged to be the duty period, processing advances to step 602, in which it is judged whether or not a first purge condition is established. The first purge condition is to establish the air/fuel ratio learning condition excluding the fuel-cut. If the first purge condition is not established, the processing proceeds to step 610, the related RAM is initialized. In step 611, the duty value DPG and the purge ratFPGR are cleared, and the processing advances to step 615, wherein the purge control valve 38 is switched OFF (closed).

When the first purge condition is met in step 602, the processing goes forward to step 603, in which it is judged whether or not a second purge condition is established. The second purge condition implies not the fuel-cut but an establishment of the air/fuel ratio learning completion flag XKGi in a learning completion region such as XKGi=1. If the second purge condition is not established, the processing proceeds to step 611, wherein the duty value DPG and the purge ratFPGR are cleared. Then, the processing advances to step 615 where the purge control valve 38 is switched OFF (closed). Further, when the second purge condition is established, the processing proceeds to step 604, in which a timer value of a purge execution timer is incremented. Then, in step 605, a purge ratFPG100 when the purge control valve 38 is fully opened is obtained from an intake air quantity QA rate of a purge flow ratFPGQ (see FIG. 13(*a*)) when the purge control valve 38 is fully opened in accordance with the following formula:

$$PG100 = (PGQ/QA) \times 100 \tag{4}$$

Next, it is judged in step 606 whether or not the air/fuel ratio feedback correction quantity FAF falls within a predetermined ±15% range such as 0.85<FAF<1.15 (FKFAF85<FAF<KFAF15). When falling within this range, in step 606A, a target purge rate tPGR is increased by the following formula:

$$tPGR = PGR + KPGRu \tag{5}$$

Figure 13:
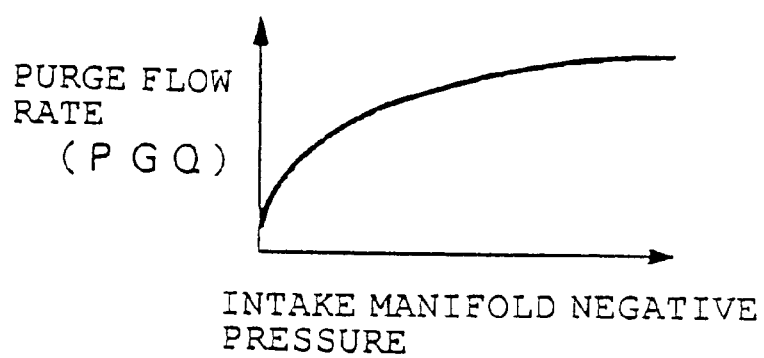
FIGS. 13 a–b, 13 (a) is a graphic chart showing a purge flow rate characteristic with respect to an intake manifold negative pressure.
Figure 13:
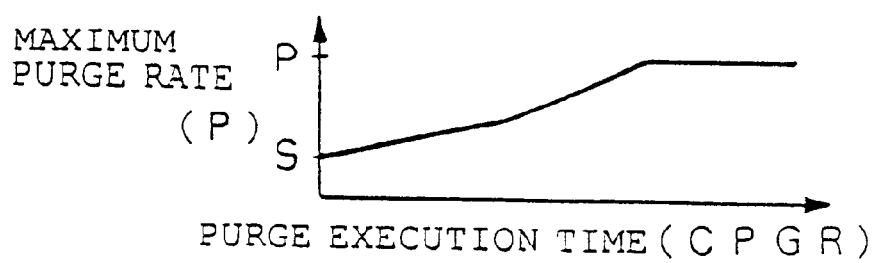

The maximum value of tPGR is, however, restricted to P% (e.g., 6%) shown in FIG. 13(*b*). Whereas if the air/fuel ratio feedback correction quantity FAF does not fall within the predetermined range, the processing proceeds to step 606B. In step 606B, the target purge rate tPGR is decreased by the following formula:

$$tPGR = PGR - KPGRd \tag{6}$$

The minimum value of tPGR is, however, restricted to S% (e.g., 0%) shown in FIG. 13(*b*). Thus, the reason why the target purge rate tPGR is restricted between S%–P% lies in preventing fluctuations in the air/fuel ratio due to the purging. Further, KPGRu and KPGRd are fixed values which are previously empirically obtained.

Next, in step 607, the duty value DPG defined as a valve open time of the purge control valve 38 is calculated such as:

$$DPG = (tPGR/PG100) \times 100 \tag{7}$$

Namely, the valve opening quantity of the purge control valve 38 is controlled in accordance with a ratio of the target purge rate tPGR to a full-open purge ratFPG 100. The maximum value of this duty value DPG is, however, 100%. Next, in step 608, an actual purge ratFPGR is calculated by the following formula:

$$PGR = PG100 \times (DPG/100) \tag{8}$$

Thereafter, in step 609, the duty value DPG is stored as a value DPG0 of the last time, and the purge ratFPGR is stored as a purge ratFPGR0 of the last time.

After the purge control has been thus finished, the processing proceeds to step 612, in which the purge control valve 38 is electrified and thereby switched ON. In subsequent step 613, the electrification end time TDPG of the purge control valve 38 is calculated, and this routine comes to an end.

<Method of Calculating Fuel Injection Quantity (Time) in T-J System>

Next, when in the lean-burn operation in the low-middle load region, the fuel injection quantity is determined based on the T-J system in the following formula:

$$QALLINJ = QALL - FPG \tag{9}$$

where
QALLINJ: the last fuel injection quantity,
  QALL: the basic fuel injection quantity determined from the accelerator aperture and the engine speed, and
  FPG: the purge air/fuel ratio correction coefficient (the vapor fuel quantity correction quantity).

Figure 14:
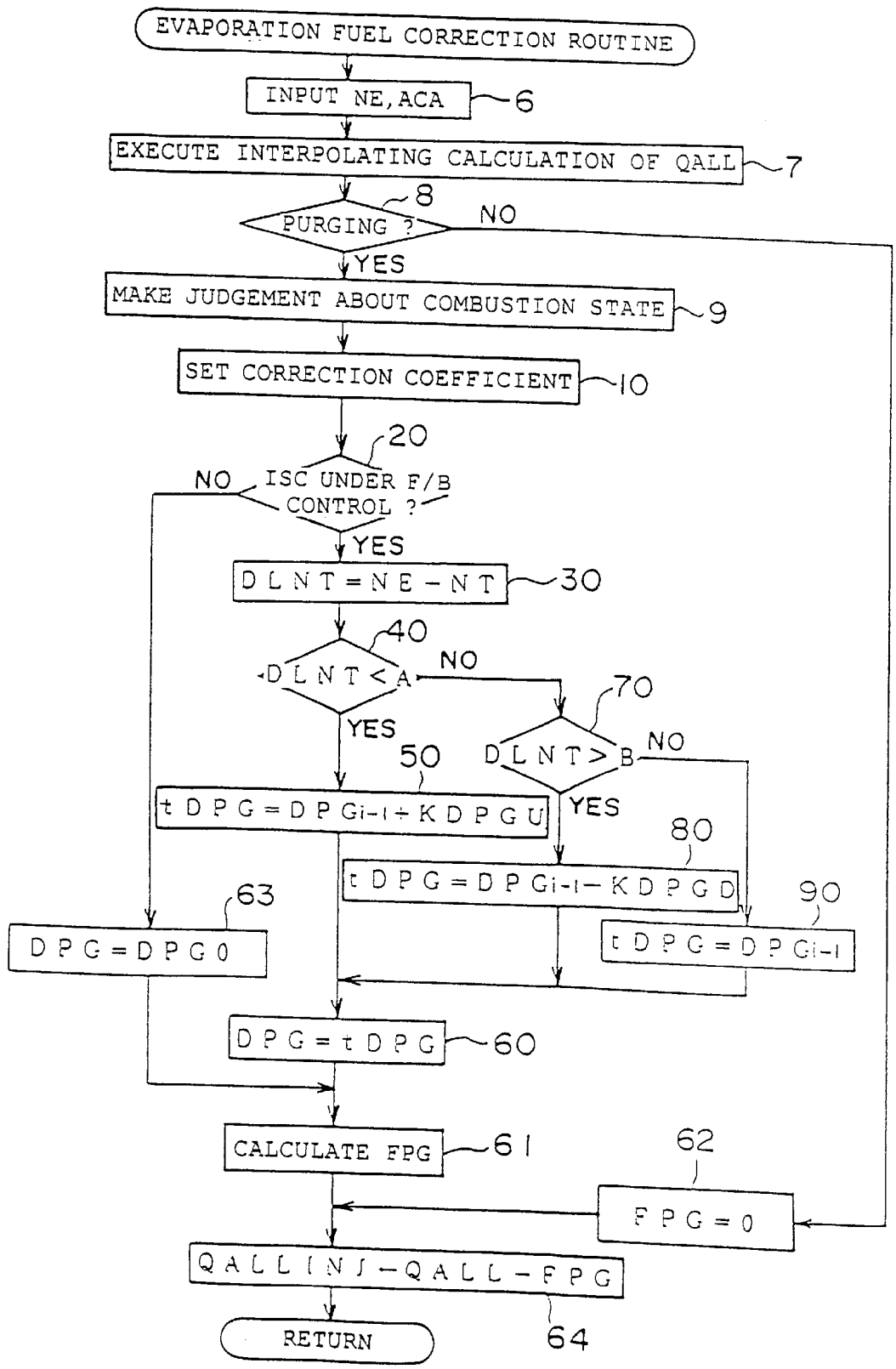
FIG. 14 is a flowchart showing a vapor fuel correction routine when in a T-J lean burn.

The last fuel injection quantity when in the lean-burn operation also depends upon a quantity of the vapor fuel introduced by the purge control module. Hence, there is given an explanation of how the last fuel injection quantity is determined, referring to a flowchart in FIG. 14 showing a fuel correction routine incidental to the purge control when in the lean-burn operation. It should be noted that the last fuel injection quantity QALLINJ is a concept corresponding to the fuel injection quantity TAU determined according to the formula (1) in the D-J system.

The routine in FIG. 14 is executed by a computer 30 with an interrupt at an interval of a predetermined time.

When the processing moves to this routine, the engine speed NE and the accelerator aperture ACCP are inputted to the ECU 30 (step 6). Subsequently, the basic fuel injection quantity (QALL) is calculated in accordance with the engine speed of the engine and the accelerator aperture which have been inputted (step 7).

That is, to begin with, the basic fuel injection quantity corresponding to the engine speed and the accelerator aperture is calculated in an interpolating manner from an unillustrated map in which to determine a correlation between the basic fuel injection quantity, and the engine speed and the accelerator aperture. Note that a plurality of maps corresponding to the operating conditions or the combustion states, are prepared as injection quantity maps, from which the one concerned is properly selected for use.

It is judged in step 8 whether in the process of the purging or not. If in the process of the purging, the present combustion state is judged in step 9 from the accelerator aperture ACCP. In step 10, values of a variety of correction coefficients under the purge control corresponding to the respective combustion states, are read from the ROM 33. The variety of correction coefficients are, e.g., purge duty updated quantities KDPGU and KDPGD est.

Note that the engine 1 is capable of taking the respective combustion states such as the stratified charge combustion, the semi-stratified charge combustion, the homogeneous lean combustion and the homogeneous combustion under the control of the ECU 30. Then, if judged to be in the stratified combustion state based on the number-of-engine-rotations NE and the accelerator aperture ACCP, a combustion mode FMODE is set to 0". If in the semi-stratified charge combustion state, the combustion mode FMODE is set to 1". If in the homogeneous lean combustion state, the combustion mode FMODE is set to 2". If in the execution of the homogeneous combustion, the combustion mode FMODE is set to 3".

It is judged in step 20 whether or not under the feedback control of idle speed control (ISC). It is herein judged whether or not a special ISC control routine is executed. If the ISC control routine is not executed, the engine speed is conceived unstable, and therefore the judgement thereof is NO. Then, the processing diverts to step 63. If the ISC control routine is executed, the engine speed is conceived stable, and therefore the judgement thereof is YES. Then, the processing shifts to step 30.

In step 30, a deviation DLNT of an actual engine speed NE from a target engine speed NT is calculated. Subsequently, it is judged in step 40 whether or not the deviation DLNT is smaller than a first judgement value A (rpm). When judging in step 40 that the deviation DLNT is less than the first judgement value A, i.e., when the engine rotates with the stability, the processing shifts to step 50, in which a tentative request purge duty value tDPG is calculated. The tentative purge duty value tDPG be, it is assumed, a value obtained by adding the purge duty updated quantity KDPGU to a value of the last time (a last request duty value obtained in the control routing of the last time) $DPG_{i-i}$.

This purge duty updated value KDPGU is previously empirically obtained and stored in the ROM 33. Next, in step 60, the tentative request purge duty value tDPG calculated in step 50 is set as the last request duty value DPG, and this control routine is ended.

Further, when judging in step 40 that the deviation DLNT is over the first judgement value A, it is assumed that there be fluctuations in the rotations of engine. It is then judged in step 70 whether or not the deviation is smaller than a second judgement value B (rpm). It should be noted that A<B. When judging in step 70 that the deviation DLNT exceeds the second judgement value B, the processing shifts to step 80, in which the tentative request purge duty value tDPG is calculated. The tentative purge duty value tDPG be, it is assumed, a value obtained by subtracting the purge duty updated quantity KDPGD from the value of the last time (the last request duty value obtained in the control routing of the last time) $DPG_{i-i}$. This purge duty updated value KDPGD is previously empirically obtained and stored in the ROM 33.

Note that the purge duty updated quantities KDPGU, KDPGD may be set to values different depending upon the combustion states or the operating states of the engine. For example, the values are set large when in the homogeneous combustion and set small when in the stratified charge combustion. When in the homogeneous combustion, a large amount of the purge can be thereby introduced. When in the stratified charge combustion, a change in the purge is small, and hence the combustion can be stabilized. Further, when the combustion is switched over, the updated quantities may be changed to values corresponding to the combustion after being switched over by changing skipwise the purge duty updated quantities KDPGU, KDPGD, thereby making it feasible to stabilize the combustion after being switched over.

Next, in step 60, the tentative request purge duty value tDPG calculated in step 80 is set as the last request duty value DPG.

Further, when judging in step 70 that the deviation DLNT is under the second judgement value B, the processing shifts to step 90, in which the tentative request purge duty value tDPG is calculated. The tentative request purge duty value tDPG is set to the last request duty value $DPG_{i-i}$ of the last time.

Subsequently, the processing moves to step 60, wherein the tentative request purge duty value tDPG obtained in step 90 is set as the last request duty value DPG.

Incidentally, when judging in step 20 that the ISC control routine is not executed, i.e., if the ISC is not under the F/B control and is unstable, the duty value DPGO temporarily stored as DPG when in the stable state of the last time, is substituted into the last request duty value DPG (step 63).

Accordingly, the ECU 30 duty-controls an electromagnetic valve 81 on the basis of the last request duty value DPG obtained in step 60 or 63.

Note that the purge control valve is duty-controlled in such a way that if the purge execution condition which will be described later on is established, the duty ratio rises from 0" when the urging is started, then controlled in terms of its magnitude under the predetermined control and set to 0" just when a purge inhibition command is inputted.

The duty ratio is determined in step 60, and thereafter the vapor fuel quantity correction quantity is converted from the duty ratio. More specifically, since the aperture of the purge control valve is determined from the duty ratio and the purge quantity is determined based on the intake pipe negative pressure etc, and, in addition these values, if the concentration of the vapor fuel contained in the purge gas which will be described later on is known, a quantity of the vapor fuel can be known (step 61) This quantity of vapor fuel is supplied to the internal combustion engine, and therefore, in step 64, the injection quantity of the fuel finally supplied to the internal combustion engine is corrected by subtracting the vapor fuel quantity as a correction quantity from the previously obtained basic fuel injection quantity in accordance with the previous formula (9).

Note that when judging in step 8 that the processing is not in the purging, the vapor fuel quantity correction quantity is set to 0" in step 62, and the previously obtained basic fuel injection quantity is set directly as the last fuel injection quantity (QALLINJ).

Thereafter, the fuel injection is carried out according to a specially predetermined fuel injection program.

In a fuel correction routine in FIG. 14, in step 40, if the deviation DLNT of the engine speed NE defined as the actual engine speed from the target number-of-engine-rotations NT, is less than the first judgement value A, the actual number-of-rotations NE is smaller than the target number-of-engine-rotations NT. Hence, for increasing the purge quantity, the tentative request purge duty value tDPG is set to a new tentative request purge duty value tDPG obtained by adding the purge duty updated quantity KDPGU to the value $DPG_{i-i}$ of the last time (which is the last request duty value obtained in the control routine of the last time). It follows that the electromagnetic valve 81 is controlled by using the thus obtained tentative request purge duty value tDPG as the last request duty value DPG. As a result, the purge quantity of the vapor fuel increases, and the engine speed also rises.

Further, in the purge control routine in FIG. 14, in step 70, if the deviation DLNT of the engine speed NE defined as the actual engine speed from the target number-of-engine-rotations NT, exceeds the second judgement value B, the actual number-of-rotations NE is larger than the target number-of-engine-rotations NT. Hence, for decreasing the purge quantity, the tentative request purge duty value tDPG is set to a value obtained by subtracting the purge duty updated quantity KDPGU from the value $DPG_{i-i}$ of the last time (which is the last request duty value obtained in the control routine of the last time) (step 80). Then, this tentative request purge duty value tDPG is set as the last request duty value DPG. As a result, the purge quantity of the vapor fuel decreases. Therefore, the engine speed decreases.

Moreover, in the fuel correction routine in FIG. 14, if the deviation DLNT of the engine speed NE defined as the actual engine speed from the target engine speed NT, is over the first judgement value A and under the second judgement value V, in step 90, the tentative request purge duty value tDPG is set as the last request duty value DPG, as a result, if the deviation DLNT falls within the above range, the purge quantity of the vapor fuel is set as a fixed value.

Note that in the cylinder direct injection type internal combustion engine, the purge execution condition may be the state of the warm-up having been completed, i.e., the state after the temperature of the cooling water rises to the predetermined temperature or higher, and, in addition, a state after a predetermined time, e.g., 30 sec has elapsed since the cranking was completed.

<Vapor Concentration Learning Control under T-J Operation>

As discussed above, when the concentration (of the vapor fuel (vapor concentration) contained in the purge gas is known in step 61, the vapor fuel quantity is also known. Hence, the vapor concentration learning control is required also in the operation based on the T-J system.

Given herein is an explanation of a relationship in terms of calculation between the basic fuel injection quantity and the vapor fuel concentration in the purge gas.

The vapor fuel concentration in the purge gas is required fro calculating FPG necessary for calculating the fuel injection quantity. Then, the calculation of FPG is needed for calculating the fuel injection quantity both in the D-J system and in the T-J system.

Incidentally, when in the lean-burn, the air/fuel ratio does not precisely work. Therefore, in accordance with the first embodiment, when the concentration learning is needed, the operation is temporarily changed to the D-J operation, i.e., to the homogeneous combustion where the theoretical air/fuel ratio is set to the target air/fuel ratio. Then, the vapor fuel concentration is detected and learned, and, upon a completion of this learning, the operation returns to the T-J operation, in which the basic fuel injection quantity is calculated.

Figure 15:
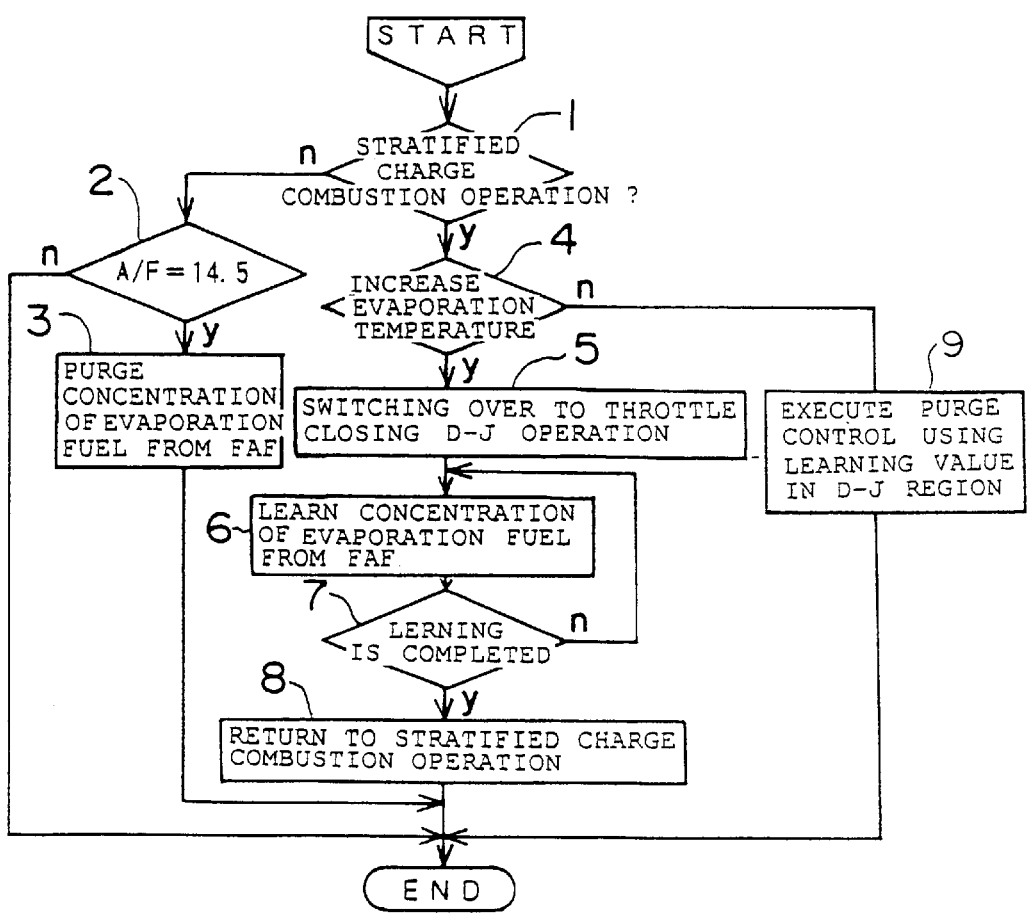
FIG. 15 is a flowchart showing a switching operation for learning the concentration when in the lean-burn according to the present invention.

Namely, as shown in FIG. 15, at the first onset, it is judged whether or not the engine is on the operation of the stratified charge combustion (the lean-burn) (step 1). If not on the operation of the stratified charge combustion, it is judged whether or not the air/fuel ratio is 14.5, i.e., whether or not on the air/fuel ratio feedback control operation (the D-J operation) where the theoretical air/fuel ratio is set to the target A/F (step 2). If on the D-J operation, the purge concentration learning is performed based on the above-described air/fuel ratio feedback correction coefficient FAF (step 3). Whereas if not on the D-J operation, the processing is directly finished.

In step 1, if judged to be on the stratified charge combustion operation, it is judged from the operating state whether or not the purge concentration increases (step 4). That is, changes-of-state of the vapor fuel (which are changes in quantity and concentration of the vapor fuel) are predicted as an operating state based on an intra fuel tank pressure, a temperature of the fuel tank, purge-cut or non-purge-cut and an engine load (the operating state). If the intra fuel rank pressure and the fuel tank temperature are high, it is predicted that the vapor fuel has a high concentration. In the case of the purge-cut being effected, the vapor fuel is accumulated during the purge-cut, and it is therefor predicted that the vapor fuel exhibits the high concentration. Further, if the engine load is large, the tank temperature rises. Hence, it is predicted that the vapor fuel concentration is high in the case of the large engine load.

Herein, if it is predicted that the purge concentration increases, there is performed throttle closing control under which to control the throttle valve in such a closing direction as to reduce the aperture thereof (step 5), and the operation switched over to the D-J operation.

Thereafter, in step 6, the purge concentration is relearned from the air/fuel ratio feedback correction coefficient FAF in the D-J operation described above. Then, upon a completion of the relearning (step 7), the operation returns to the stratified charge combustion operation (the lean-burn operation) (step 8), thus finishing the processing.

Whereas if it is judged in step 4 that the purge concentration does not increase or it is, if any, small, the purge control is implemented by use of the concentration learning value learned last time in the D-J region (step 9).

A method of performing the purge concentration learning control by switching over the operation to the D-J operation during the T-J operation, will hereinafter be explained in greater details referring to a flowchart in FIG. 16.

Processes in the flowchart shown in FIG. 16 are executed with an interrupt at an interval of a predetermined time.

To start with, it is judged in step 101 whether or not a combustion mode (NMODE) is 6 (D-J system).

If the combustion mode is based on the D-J system, it is judged in step 102 whether or not the control duty value DPG of the purge control valve is 0". The control duty value DPG serves to determined an aperture of the purge control valve. When DPG is 0", this indicates that the aperture is 0". When DPG is 0", the processing proceeds to step 103, in which the vapor fuel quantity correction quantity FPG is set to 0". Namely, the final fuel injection quantity of the fuel injected out of the fuel injection valve is determined based on the formula (9) The control duty value DPG being 0" (DPG=0), the quantity of the vapor fuel to be supplied comes to zero, and hence FPG is also set to 0", thus setting the value of the basic fuel injection quantity as the final fuel injection quantity.

Thereafter, in step 104, the average value FAFAVE of the air/fuel ratio feedback correction quantities is substituted into the air/fuel ratio feedback correction quantity FAFIDL when idling.

When judging in step 102 that DPG is not 0", in step 105, a purge quantity Qapg (containing both of the air and the vapor fuel) is calculated from DPG, Pm and Pa by using a predetermined map, where Pm is the intake pipe negative pressure, and Pa is the atmospheric pressure.

Subsequently, a calculation such as FPG=FAFIDL−FAFAVE is done in step 106, where KPG is the vapor concentration learning value.

Further, in step 107, an evaporation quantity (a vapor fuel quantity) QFPG in the purging is calculated such as QFPG=QALL*KPG, where QALL is the basic fuel injection quantity.

Subsequently, in step 108, a ratio (vapor fuel concentration) KFPG of the vapor fuel quantity to the purge quantity is given by KFPG=QFPG/QAPG.

If the combustion mode is not 6 in step 101, it is judged in step 109 whether or not a throttle closing quantity trtc(i) is 0".

When trtc (i) is 0", the purge quantity QAPG is calculated from DPG, Pm and Pa in step 111. Further, in step 112, the evaporation quantity (the vapor fuel quantity) QFPG in the purging is calculated such as QFPG=QAPG*KFPG. Next, it is judged in step 113 whether or not the engine speed NE is larger than the target engine speed NT+C1. If the engine speed NE is larger than the target engine speed NT+C1, it is judged in step 114 whether or not the engine speed NE is smaller than the target engine speed NT+C4. Herein, there is established a relationship such as NT+C1<NT+C4. When judging in step 114 that the engine speed NE is smaller than the target engine speed NT+C4, a purge air/fuel ratio correction quantity FPG (i) of this time is calculated in step 115 such as:

$$FPG(i)=FPG(I-1)+Cf$$

where FPG(i−1) is the purge air/fuel ratio correction quantity of the last time, and Cf is the redetermined updated quantity.

Subsequently, in step 116, there is performed a calculation such as FPGF=FPG(i)+QFPG, where FPGF is the last in-the-purging fuel quantity obtained by adding QFPG (an in-the-purge vapor fuel quantity) to FPG(i).

When judging in step 114 that the engine speed NE is not smaller than the target engine speed NT+C4, a control duty value DPG(i) of this time is given in step 117 such as:

$$DPG(i)=DPG(i-1)-Cd$$

where DPG(i−1) is the control duty value of the last time, and CD is the predetermined updated quantity.

Performed next is a calculation such as FPGF=FPG(i−1)+QFPG.

When judging in step 113 that the engine speed NE is not larger than the target engine speed NT+C1, it is judged in step 119 whether or not the engine speed NE is smaller than the target engine speed NT+C2. Herein, there is established a relationship such as NT+C2<NT+C1. If the engine speed NE is not smaller than the target engine speed NT+C2, the processing comes to an end. If the engine speed NE is smaller than the target engine speed NT+C2, it is further judged in step 120 whether or not the engine speed NE is not smaller than the target engine speed NT−C3. Herein, there is established a relationship such as NT−C3<NT+C2.

If the engine speed NE is larger than the target engine speed NT−C3, a calculation is performed, wherein DPG(i)=DPG(i−1)+Cd. Thereafter, FPGF is given such as FPGF=FPG(i−1)+QFPG, and the processing is finished.

When judging in step 120 that the engine speed NE is not larger than the target engine speed NT−C3, there is done in step 123 a calculation such as FPG(i)=FPG(i−1)−Cf. The processing shift step 116, in which there is calculated FPGF=FPG(i)+QFPG. Then, the processing is ended.

Note that it is feasible not only to correct the fuel injection quantity in accordance with the learned vapor fuel concentration but also to change the fuel injection state in accordance with the vapor fuel concentration. Herein, the injection state implies the injection quantity, the injection timing and the injecting direction of the injection valve.

Second Embodiment

As discussed above, in the direct injection internal combustion engine in accordance with the present embodiment, the combustion is switched over to the homogeneous combustion when in the rich spike and when ensuring the brake negative pressure. Accordingly, the purging is carried out by catching this timing, and thus the concentration learning is implemented, in which case the learning value thereof can be utilized for the purge control when in the stratified charge combustion.

What has been specifically exemplified in the preceding embodiment is the internal combustion engine comprising the purge passageway for purging, into the intake system, the vapor fuel generated from the fuel storing unit for storing the fuel of the internal combustion engine, the purge control module for controlling the vapor fuel quantity introduced into the intake system from the purge passageway in accordance with the operating state of the internal combustion engine, and the combustion control module for switching over the homogeneous combustion operation and the lean-burn operation in accordance with the operating state of the internal combustion engine. In the thus constructed internal combustion engine, when the internal combustion engine is switched over to the homogeneous combustion operation from the lean-burn operation corresponding to the operating state, the concentration of the vapor fuel is detected.

That is, when in the rich spike and when under the throttle closing control for ensuring the brake negative pressure, the operation is switched over to the target air/fuel ratio feedback control operation based on the D-j operation from the T-J operation defined as the stratified charge combustion operation. In such a case, however, the vapor fuel concentration learning is executed as in the preceding embodiment. Then, a learning value thereof is used when the next T-J operation is carried out next time, thereby correcting the fuel injection quantity and controlling the change of the fuel injection state.

Note that the present invention can be applied, in addition to what has been exemplified so far, to a port injection type lean-burn internal combustion engine in which the fuel is injected to the intake pipe.

As discussed above in details, according to the present invention, when detecting the vapor fuel concentration during the lean-burn operation of the internal combustion engine, the internal combustion engine is switched over to the homogeneous combustion operation from the lean-burn operation, and the vapor fuel concentration is detected under the homogeneous combustion operation. It is therefore feasible to precisely detect the vapor fuel concentration and utilize the detected fuel concentration for controlling the operation of the engine, whereby the rich misfire etc can be prevented.

Moreover, as in the case of the rich spike control and the throttle closing control for ensuring the brake booster negative pressure, the vapor fuel concentration is detected by catching the timing when the internal combustion engine is switched over to the homogeneous combustion operation from the lean-burn operation depending on the operating state, and this detected value is utilized for controlling the operation of the engine. In this case, there is no necessity for taking trouble to switch over to the homogeneous combustion operation for detecting the concentration, and therefore it follows that the system is allowed to concentrate upon its essential control.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for controlling a supply of a vapor fuel in a lean-burn internal combustion engine, comprising:

a purge passageway for purging, into an intake system, a vapor fuel generated from fuel storing means for storing the fuel of said internal combustion engine;

purge control means for controlling a quantity of the vapor fuel introduced into said intake system from said purge passageway in accordance with an operating state of said internal combustion engine;

concentration learning means for detecting the concentration of the vapor fuel purged by said purge control means into said intake system; and combustion control means for switching over a homogeneous combustion operation and a lean-burn operation in accordance with the operating state of said internal combustion engine, said concentration learning means including:

learning judging means for judging whether or not the vapor fuel concentration is required to be learned during the lean-burn operation of said internal combustion engine; and operation switch-over means for switching over said internal combustion engine from the lean-burn operation to the homogeneous combustion operation when said learning judging means judges that the concentration learning is required, wherein the concentration of the vapor fuel is learned under the homogeneous combustion operation.

2. An apparatus for controlling a supply of a vapor fuel in a lean-burn internal combustion engine according to claim 1, further comprising:

target air/fuel ratio control means for controlling the operation so that an air/fuel ratio becomes a target air/fuel ratio when in the homogeneous combustion, wherein said concentration learning means executes the learning of the concentration of the vapor fuel under a target air/fuel ratio control operation.

3. An apparatus for controlling a supply of a vapor fuel in a lean-burn internal combustion engine according to claim 1, wherein said learning judging means predicts a change of a state of the vapor fuel, and judges from the predicted change thereof whether a necessity for the learning arises or not.

4. An apparatus for controlling a supply of a vapor fuel in a lean-burn internal combustion engine, comprising:

a purge passageway for purging, into an intake system, a vapor fuel generated from fuel storing means for storing the fuel of said internal combustion engine;

purge control means for controlling a quantity of the vapor fuel introduced into said intake system from said purge passageway in accordance with an operating state of said internal combustion engine;

concentration learning means for detecting the concentration of the vapor fuel purged by said purge control means into said intake system; and combustion control means for switching over a homogeneous combustion operation and a lean-burn operation in accordance with the operating state of said internal combustion engine, wherein said concentration learning means, when switched over to the homogeneous combustion operation from the lean-burn operation in accordance with the operating state, performs the learning of the concentration of the vapor fuel under the homogeneous combustion operation.

5. An apparatus for controlling a supply of a vapor fuel in a lean-burn internal combustion engine according to claim 4, further comprising:

target air/fuel ratio control means for controlling the operation so that an air/fuel ratio becomes a target air/fuel ratio when in the homogeneous combustion, wherein said concentration learning means executes the learning of the concentration of the vapor fuel under a target air/fuel ratio control operation.

6. An apparatus for controlling a supply of a vapor fuel in a lean-burn internal combustion engine according to claim 1, wherein said combustion control means changes a state of the fuel injection in accordance with the concentration of the vapor fuel.

7. An apparatus for controlling a supply of a vapor fuel in a lean-burn internal combustion engine according to claim 4, wherein said combustion control means changes a state of the fuel injection in accordance with the concentration of the vapor fuel.

* * * * *